United States Patent
Fujita

(10) Patent No.: US 9,532,332 B2
(45) Date of Patent: Dec. 27, 2016

(54) NODE DEVICE FOR RELEASING ALLOCATION OF THE UNUSED CHANNEL TO THE RADIO INTERFACE

(75) Inventor: Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 661 days.

(21) Appl. No.: 13/879,661

(22) PCT Filed: Aug. 23, 2011

(86) PCT No.: PCT/JP2011/004664
§ 371 (c)(1),
(2), (4) Date: Jun. 26, 2013

(87) PCT Pub. No.: WO2012/053144
PCT Pub. Date: Apr. 26, 2012

(65) Prior Publication Data
US 2013/0288733 A1    Oct. 31, 2013

(30) Foreign Application Priority Data
Oct. 19, 2010  (JP) ................................. 2010-234131

(51) Int. Cl.
*H04W 72/04*  (2009.01)
*H04W 40/24*  (2009.01)
*H04W 84/18*  (2009.01)

(52) U.S. Cl.
CPC ............ *H04W 72/04* (2013.01); *H04W 40/24* (2013.01); *H04W 84/18* (2013.01)

(58) Field of Classification Search
CPC ....... H04W 84/18; H04W 72/04; H04L 45/00; H04L 5/0032; H04B 17/382
See application file for complete search history.

(56) References Cited

U.S. PATENT DOCUMENTS

2004/0023651 A1* 2/2004 Gollnick ............... G08C 17/02
                                                            455/423
2007/0132846 A1* 6/2007 Broad .................. G08B 25/009
                                                            348/143
(Continued)

FOREIGN PATENT DOCUMENTS

JP        2002-319942 A     10/2002

OTHER PUBLICATIONS

International Search Report of PCT Application No. PCT/JP2011/004664 mailed on Nov. 22, 2011.

(Continued)

*Primary Examiner* — Vladimir Magloire
*Assistant Examiner* — Ernest Tacsik

(57) ABSTRACT

A node device 100 is configured to: allocate a channel for communication to each of radio interfaces; between the radio interface and a radio interface which is included by an adjacent node device and to which the same channel as the channel allocated to the radio interface is allocated, establish a communication link using the channels; and, by using a communication link (a use communication link) set for the destination of received data among established communication links, transfer the data to the adjacent node device. The node device 100 specifies an unused channel that is other than a channel used by a communication link set as the use communication link among already allocated channels (101), and releases allocation of the unused channel (102).

11 Claims, 14 Drawing Sheets

(56) References Cited

U.S. PATENT DOCUMENTS

| | | | | |
|---|---|---|---|---|
| 2007/0225029 | A1* | 9/2007 | Abusch-Magder ... | H04W 24/02 455/525 |
| 2009/0219868 | A1* | 9/2009 | Lee ..................... | H04L 5/0096 370/329 |
| 2009/0285165 | A1* | 11/2009 | Berglund ........... | H04W 72/082 370/329 |
| 2010/0142447 | A1* | 6/2010 | Schlicht ................ | H04W 4/20 370/328 |

OTHER PUBLICATIONS

J. Zhao, H. Zheng, G. Yang, "Distributed Coordination in Dynamic Spectrum Allocation Networks," Proceedings of IEEE DySPAN (New Frontiers in Dynamic Spectrum Access Networks), IEEE, Nov. 2005, pp. 259-268.

M. K. Marina, S. Das, "A Topology Control Approach for Utilizing Multiple Channels in Multi-Radio Wireless Mesh Networks," Proceedings of 2nd International Conference on Broadband Networks, Oct. 2005, pp. 381-390.

* cited by examiner

Fig.3

| DESTINATION ADDRESS | NEXT HOP ADDRESS | LINK COST | CHANNEL |
|---|---|---|---|
| 10. 1. 1. 1 | 10. 1. 1. 1 | 2 | 1 |
| 10. 3. 3. 3 | 10. 3. 3. 3 | 2 | 1 |
| 10. 4. 4. 4 | 10. 3. 3. 3 | 3 | 1 |
| 10. 5. 5. 5 | 10. 3. 3. 3 | 4 | 1 |

Fig.4

| ADJACENT NODE ADDRESS | CHANNEL | LINK COST |
|---|---|---|
| 10. 1. 1. 1 | 0 | 4 |
| 10. 1. 1. 1 | 1 | 2 |
| 10. 3. 3. 3 | 1 | 2 |
| 10. 4. 4. 4 | 0 | 4 |

Fig.5

| DESTINATION ADDRESS | NEXT HOP ADDRESS | LINK COST | CHANNEL |
|---|---|---|---|
| 10. 1. 1. 1 | 10. 3. 3. 3 | 5 | 2 |
| 10. 2. 2. 2 | 10. 3. 3. 3 | 3 | 2 |
| 10. 3. 3. 3 | 10. 3. 3. 3 | 1 | 2 |
| 10. 5. 5. 5 | 10. 5. 5. 5 | 1 | 2 |

Fig.10

| DESTINATION ADDRESS | NEXT HOP ADDRESS | LINK COST | CHANNEL |
|---|---|---|---|
| 10. 1. 1. 1 | 10. 1. 1. 1 | 4 | 0 |
| 10. 3. 3. 3 | 10. 4. 4. 4 | 5 | 0 |
| 10. 4. 4. 4 | 10. 4. 4. 4 | 4 | 0 |
| 10. 5. 5. 5 | 10. 4. 4. 4 | 5 | 0 |

Fig.11

| DESTINATION ADDRESS | NEXT HOP ADDRESS | LINK COST | CHANNEL |
|---|---|---|---|
| 10. 1. 1. 1 | 10. 2. 2. 2 | 6 | 0 |
| 10. 2. 2. 2 | 10. 2. 2. 2 | 4 | 0 |
| 10. 3. 3. 3 | 10. 2. 2. 2 | 6 | 0 |
| 10. 5. 5. 5 | 10. 5. 5. 5 | 4 | 0 |

| ADJACENT NODE ADDRESS | CHANNEL | LINK COST |
|---|---|---|
| 10. 2. 2. 2 | 0 | 4 |
| 10. 2. 2. 2 | 1 | 2 |

NODE DEVICE FOR RELEASING ALLOCATION OF THE UNUSED CHANNEL TO THE RADIO INTERFACE

This application is a National Stage Entry of PCT/JP2011/004664 filed Aug. 23, 2011, which claims priority from Japanese Patent Application 2010-234131 filed Oct. 19, 2010, the contents of all of which are incorporated herein by reference, in their entirety.

TECHNICAL FIELD

The present invention relates to a node device having a radio interface and configuring a multi-hop communication network.

BACKGROUND ART

An expectation of realization of a cognitive radio network has been increasing. A cognitive radio network enables configuration of a communication network fit for an ambient environment, because each of node devices configuring the communication network performs communication by selecting one or more channels from among a plurality of candidates of a utilizable radio communication frequency (hereinafter, referred to as a channel) based on the ambient environment (an unused channel, a distance between node devices, a required communication bandwidth (a communication demand), and so on).

In a cognitive radio network, when any two node devices that the same channel is allocated exist within a distance that mutual propagation (communication) is allowed, a communication link using the channel is established between the node devices.

Therefore, in accordance with change of the position of each of the node devices and a channel allocated to each of the node devices, a network topology changes. Moreover, characteristics such as a distance that propagation is allowed, a capacity (e.g., a communication capability, an available bandwidth), and a loss rate (e.g., a packet loss rate) vary for each channel.

Therefore, in a cognitive radio network, by changing a channel allocated to each of the node devices, it is possible to relatively freely change the characteristics (e.g., a communication bandwidth that can be offered, a communication quality, or the like) of a communication network.

For example, between node devices where much communication demand exists, it is possible to configure a communication network so that a communication link having a large capacity is established. In this case, as a channel used by the communication link, it is possible to use a channel having a capacity as large as possible. Moreover, it is also possible to configure a communication network so that relatively many auxiliary communication paths (e.g., a disjoint path) in case of occurrence of a fault can be secured.

Thus, a cognitive radio network needs a technique for determining how to allocate a channel to each of the node devices. As this kind of technique, techniques described below are known.

For example, Non-Patent Document 1 discloses a technique of configuring a group (a coordination group) for regulating channels between a plurality of node devices to which channels similar to each other are allocated and which are located near. In this technique, a channel used by each of the node devices is determined by voting from among available channels so that the number of users sharing the same channel becomes the most.

Moreover, in this technique, each of the node devices has a plurality of radio interfaces. Therefore, in this technique, by allocating channels different for each of the radio interfaces, it is possible to establish many communication links between the node devices.

Further, Non-Patent Document 2 discloses a technique of, when allocating channels to node devices each having a plurality of radio interfaces, assuming communication links existing within a preset distance and using the same channel interfere with each other and allocating the channels so as to minimize the interference.

[Non-Patent Document 1]
J. Zhao, H. Zheng, G. Yang, "Distributed Coordination in Dynamic Spectrum Allocation Networks," Proceedings of IEEE DySPAN (New Frontiers in Dynamic Spectrum Access Networks), IEEE, November 2005, pp. 259-268

[Non-Patent Document 2]
M. K. Marina, S. Das, "A Topology Control Approach for Utilizing Multiple Channels in Multi-Radio Wireless Mesh Networks," Proceedings of $2^{nd}$ International Conference on Broadband Networks, October 2005, pp. 381-390

As mentioned above, in a cognitive radio network, when any two node devices with the same channel allocated are located within a distance which allows mutual propagation (communication), a communication link using the channel is established between the node devices. However, all of the established communication links are not used as a communication path actually.

FIGS. 1A and 1B show two examples of a network topology in a cognitive radio network. FIG. 1A shows a network topology 101 configured by five node devices A to E. To the node devices A to E, channels 0,1, channels 0,1, channels 1,2, channels 0,2 and channels 0,2 are allocated, respectively.

In this example, a communication link is established between node devices to which the same channel is allocated and which are located within a mutual propagation distance. To be specific, communication links are established between the node devices A-B, between the node devices B-C, between the node devices C-D, between the node devices D-E and between the node devices B-D, respectively.

Hereinafter, a communication link established between node devices X-Y will be described as a communication link X-Y. However, in FIGS. 1A and 1B, even when a plurality of communication links are established between certain node devices, a communication link is shown in the same manner as when only one communication link is established.

Further, a link cost is set with respect to each communication link. A link cost is a value representing the cost of transferring data from a node device to another node device adjacent thereto (an adjacent node device). In this example shown in FIG. 1A, link costs set with respect to communication links A-B, B-C, C-D, D-E and B-D are 2, 2, 1, 1 and 4 , respectively.

In path control, generally, a communication path is determined so that the sum of link costs set with respect to communication links configuring a communication path becomes the minimum. Therefore, in the abovementioned example shown in FIG. 1A, as a communication path between the node devices B and D, not a communication path passing through the communication link B-D but a communication path passing through the communication links B-C and C-D is selected because the sum of the link costs is smaller. That is to say, the communication link B-D is a communication link through which traffic does not pass (i.e., data is not transmitted).

Further, FIG. 1B shows a network topology 102 configured by four node devices A to D. To the node devices A to D, channels 1 and 2, channels 0 and 1, channels 0 and 2, and channels 1 and 2 are allocated, respectively. In this example, a communication link is established between node devices to which the same channel is allocated and which are located within a mutual propagation distance.

To be specific, communication links are established between the node devices A-B, etween the node devices B-C, between the node devices C-D, between the node devices D-A and between the node devices B-D, respectively. Link costs set with respect to the communication links A-B, B-C, C-D, and B-D are 4, 6, 1, 1 and 2, respectively.

Therefore, in this example, for the same reason as in the example shown in FIG. 1A, the communication links A-B and B-C are communication links through which traffic does not pass.

Thus, in a cognitive radio network, even when a channel is allocated to a radio interface, there is a case that a communication link using the channel is not set as a use communication link. Herein, a use communication link is a communication link configuring a communication path that a node device uses for transferring data. Moreover, even when a channel is allocated to a radio interface, there is a case that a communication link using the channel is not established.

In a case that a channel is thus allocated to a radio interface wastefully, the following problems arise.

For example, in a case that a channel of a certain frequency is divided in accordance with TDMA (Time Division Multiple Access) and allocated to a plurality of nodes, there is a need to allocate different timeslots to the node devices with the channel allocated, respectively.

In this case, when some of the node devices are not using the channel for communication links set as use communication links, the timeslots allocated to the channel are wasted (are not used for transfer of data). In other words, a timeslot allocated to a channel used for a communication link set as a use communication link is made to be short wastefully.

Further, in a case that there is a channel which is not used for a communication link set as a use communication link, electric power is wasted because electric power is supplied to a radio interface to which the channel is allocated.

Thus, because a node device used in the abovementioned technique is kept in a state that a channel is wastefully allocated to a radio interface, the problems as described above arise.

Such problems also arise in a communication network other than a cognitive radio network. For example, such problems also arise in a multi-hop communication network that performs multi-hop communication.

SUMMARY

Accordingly, an object of the present invention is to provide a node device which can solve the abovementioned problem "a state that a channel is wastefully allocated to a radio interface is kept."

In order to achieve the object, a node device according to an exemplary embodiment of the present invention is a device having one or more radio interfaces and configuring a multi-hop communication network.

Moreover, this node device is configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device.

The node device includes:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

Further, a node device according to another exemplary embodiment of the present invention is a device having one or more radio interfaces and configuring a multi-hop communication network.

Moreover, this node device is configured to:

allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device; and when queried by the adjacent node device whether to use an unused channel candidate specified by the adjacent node device as a use channel that is a channel used by a communication link set as the use communication link, judge whether a communication link established with the adjacent node device and using the unused channel candidate is set as the use communication link; and in a case that the communication link is not set as the use communication link, transmit a response representing not to use the unused channel candidate as the use channel to the adjacent node device.

Further, a node device controlling method according to another exemplary embodiment of the present invention is a method applied to a node device having one or more radio interfaces and configuring a multi-hop communication network. The node device controlling method includes:

allocating a channel for communication to each of the radio interfaces;

between the radio interface and a radio interface which is included by an adjacent node device and to which a same channel as the channel allocated to the radio interface is allocated, establishing a communication link using the channels;

by using a use communication link that is a communication link set for a destination of received data among established communication links, transferring the data to the adjacent node device;

specifying an unused channel that is a channel other than a channel used by a communication link set as the use communication link among channels allocated to the radio interface; and releasing allocation of the unused channel to the radio interface with the specified unused channel allocated.

Further, a multi-hop communication system according to another exemplary embodiment of the present invention is a system including a plurality of node devices each having one or more radio interfaces.

Moreover, in this multi-hop communication system, each of the node devices is configured to: allocate a channel for communication to each of the radio interfaces included by the node device; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device.

In addition, the multi-hop communication system includes:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

Further, a node device control program according to another exemplary embodiment of the present invention is a program executed by a node device having one or more radio interfaces and configuring a multi-hop communication network.

Moreover, the node device is configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device.

In addition the node device control program is a program including instructions for causing the node device to realize:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

Further, a node device control program according to another exemplary embodiment of the present invention is a program executed by a node device having one or more radio interfaces and configuring a multi-hop communication network.

Moreover, the node device is configured to allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device.

In addition, the node device control program is a program including instructions for causing the node device to, when queried by the adjacent node device whether to use an unused channel candidate specified by the adjacent node device as a use channel that is a channel used by a communication link set as the use communication link, judge whether a communication link established with the adjacent node device and using the unused channel candidate is set as the use communication link; and in a case that the communication link is not set as the use communication link, transmit a response representing not to use the unused channel candidate as the use channel to the adjacent node device.

With the configurations described above, the present invention can prevent a state that a channel is wastefully allocated to a radio interface is kept.

BRIEF DESCRIPTION OF DRAWINGS

FIG. 3 is a diagram showing a routing table stored by a node according to the first exemplary embodiment of the present invention;

FIG. 4 is a diagram showing a link table stored by the node according to the first exemplary embodiment of the present invention;

FIG. 5 is a diagram showing a routing table stored by a node according to the first exemplary embodiment of the present invention;

FIG. 10 is a diagram showing a routing table stored by a node according to the second exemplary embodiment of the present invention;

FIG. 11 is a diagram showing a routing table stored by the node according to the second exemplary embodiment of the present invention;

EXEMPLARY EMBODIMENTS

Below, the exemplary embodiments of a node device, a node device control method, a multi-hop communication system and a node device control program according to the present invention will be described with reference to FIGS. 1 to 18.

<First Exemplary Embodiment>
(Configuration)

Next, a first exemplary embodiment of the present invention will be described in detail with reference to the drawings.

Figure 1:
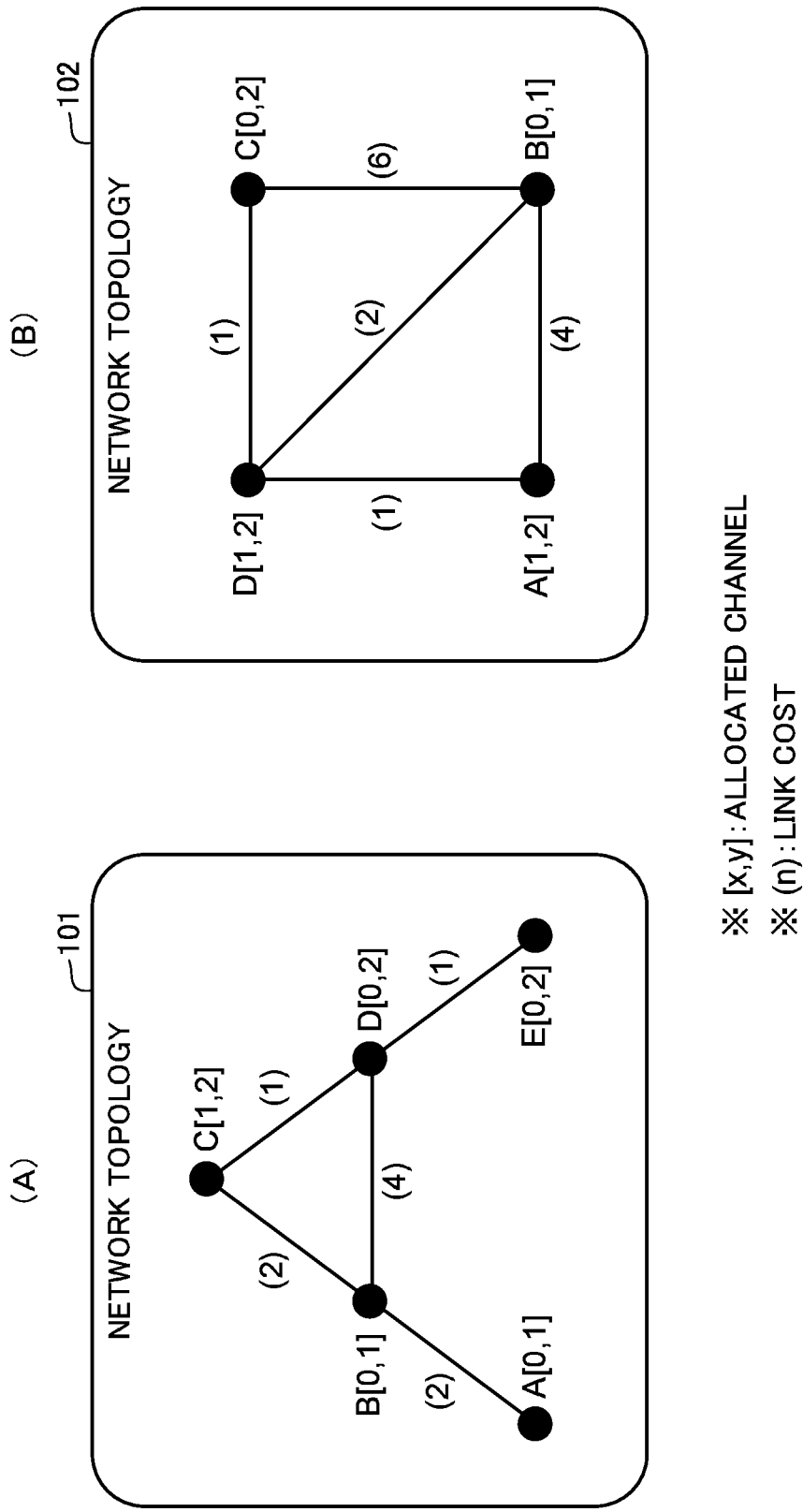
FIGS. 1A and 1B are explanation diagrams conceptually showing a network topology.
Figure 2:
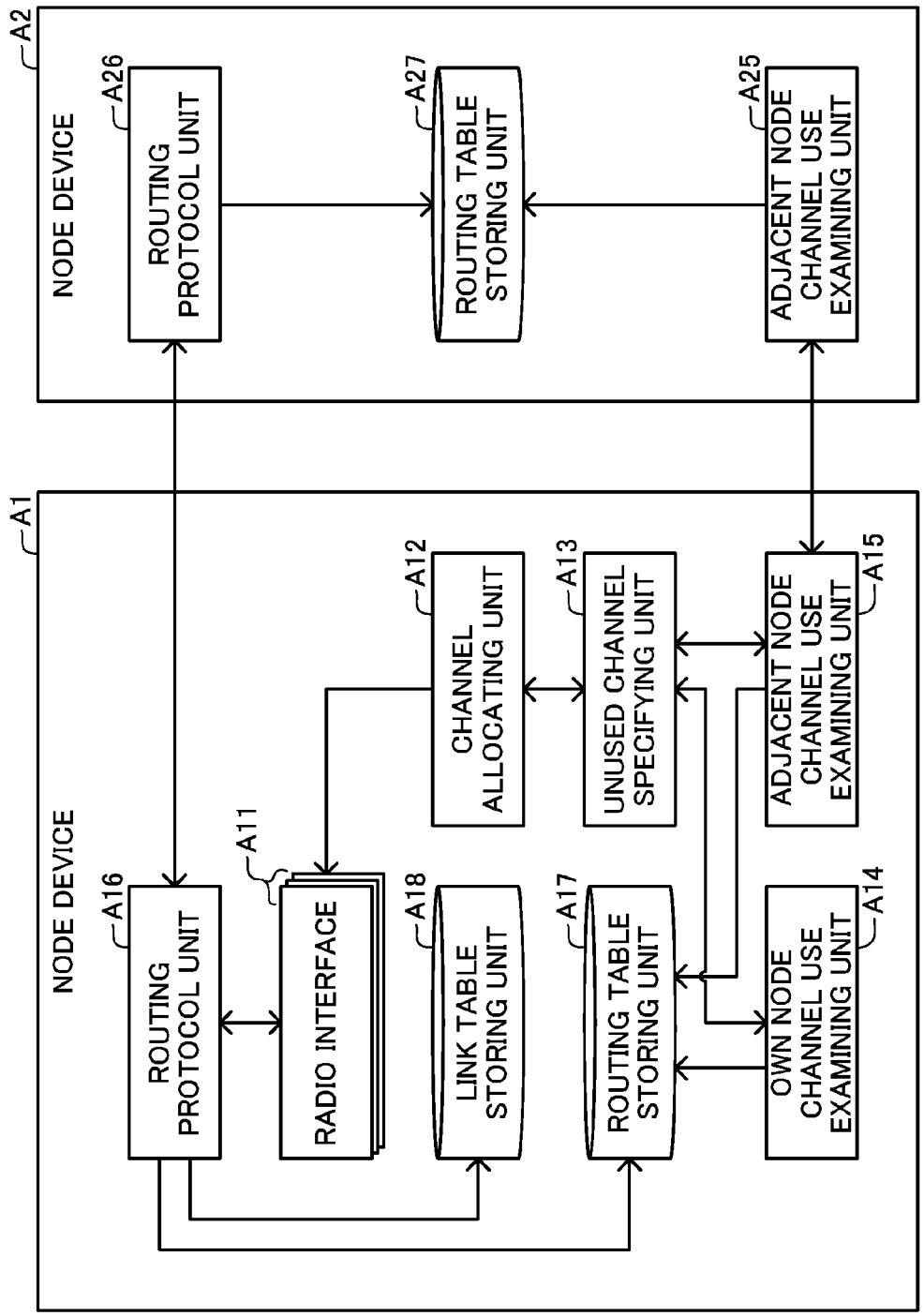
FIG. 2 is a block diagram showing the overview of a function of a communication system according to a first exemplary embodiment of the present invention.

With reference to FIG. 2, a communication system according to the first exemplary embodiment of the present invention includes a node device (also referred to as a "node" hereinafter) A1 and a node device A2. The communication system according to the first exemplary embodiment also includes another node device that is not shown in the drawings.

In this exemplary embodiment, the communication system is a multi-hop communication system that performs multi-hop communication. Multi-hop communication is communication in which a node configured by a terminal device transfers data received from another node (i.e., relays transmission of the data) and the data is thereby transmitted between the nodes. That is to say, the respective nodes configure the multi-hop communication network.

Further, in this exemplary embodiment, each of the nodes is configured to perform communication by selecting one or more channels from among a plurality of candidates of a utilizable radio communication frequency (also referred to as a "channel" hereinafter). That is to say, the communication system performs cognitive radio communication.

Each of the nodes has the same configuration and function as the node A1. Therefore, only the node A1 will be described below. In FIG. 2, the node A2 is shown with the configuration and the function partially omitted, but has the same configuration and function as the node A1 actually.

The node A1 is, for example, a personal computer, a mobile telephone terminal, a PHS (Personal Handyphone System), a PDA (Personal Data Assistance, Personal Digital Assistant), a car navigation terminal, a game terminal, or the like.

Further, the node A1 has a central processing unit (CPU) and a storage device (a memory and a hard disk drive (HDD)), which are not shown in the drawings. The node A1 is configured to realize a function described later by the CPU's execution of a program stored in the storage device.

The node A1 also has a plurality of radio interfaces A11. The node A1 may have only one radio interface A11.

Between each of the radio interfaces A11 and a radio interface of an adjacent node (an adjacent node device) to which the same channel as a channel allocated to the radio interface A11 is allocated, a communication link using the channels is established. An adjacent node is a node located away from the node A1 within a distance which allows radio communication (i.e., allowing propagation) with each other.

Each of the radio interfaces A11 performs radio communication with a radio interface of an adjacent node by using an established communication link.

Each of the radio interfaces A11 is configured so that power supply to the radio interface A11 is stopped in a case that a channel is not allocated thereto. Therefore, as the number of the radio interfaces to which channels are allocated is smaller, the amount of power consumed by the node A1 is smaller.

(Function)

A function of the node A1 includes a channel allocating unit (a channel allocation releasing means) A12, an unused channel specifying unit (part of an unused channel specifying means) A13, an own node channel use examining unit (part of the unused channel specifying means) A14, an adjacent node channel use examining unit (part of the unused channel specifying means) A15, a routing protocol unit A16, a routing table storing unit (a routing table storing means) A17, and a link table storing unit A18.

Further, a function of the node A2 includes an adjacent node channel use examining unit (part of an unused channel specifying means) A25, a routing protocol unit A26, and a routing table storing unit A27.

The channel allocating unit A12 has a function of allocating a channel to each of the radio interfaces A11. The channel allocating unit A12 is configured to be capable of allocating channels of the number of the radio interfaces A11. In this exemplary embodiment, the channel allocating unit A12 is configured to determine channels to be allocated to the radio interfaces A11 in accordance with a preset algorithm. The channels allocated to the radio interfaces by the respective nodes may be intensively determined by a server.

The channel allocating unit A12 stores information for specifying a channel allocated to each of the radio interfaces A11 and information for specifying the radio interface A11 so as to be associated with each other.

The unused channel specifying unit A13 specifies an unused channel by using the own node channel use examining unit A14 and the adjacent node channel use examining unit A15.

An unused channel is a channel which is not included in either a first channel group or a second channel group among the channels allocated to the radio interfaces A11. The first channel group is composed of channels used for communication links each set as a use communication link used by the node A1 for transferring received data to each of the adjacent nodes (e.g., the node A2).

Herein, a use communication link is a communication link set for a destination of the received data. A use communication link is determined in a routing table stored by the routing table storing unit A17 as described later.

The routing table includes entry information (record data) in which a destination address, a next hop address, a link cost and a channel are associated with each other as shown in FIG. 3.

A destination address is the address of the destination of received data (in this exemplary embodiment, an IP (Internet Protocol) address). A next hop address is the address of the transfer destination (i.e., an adjacent node) of the received data (in this exemplary embodiment, an IP address). A link cost is a value representing the cost of transferring the data from the node A1 to the adjacent node having the next hop address. A channel represents a channel used by a communication link established between the node A1 and the adjacent node having the next hop address. A next hop address and a channel configure use communication link specification information for specifying a use communication link set for the destination of data.

The second channel group is composed of channels (use channels) used for communication links each set as a use communication link used by each of the adjacent nodes (e.g., the node A2) for transferring received data to the node A1).

That is to say, an unused channel is, among the channels allocated to the radio interfaces A11, a channel which is other than channels used for communication links each set as a use communication link used by the node A1 for transferring received data to each of the adjacent nodes (e.g., the node A2) and is also other than use channels that are channels used for communication links each set as a use communication link used by each of the adjacent nodes for transferring received data to the node A1.

That is to say, the unused channel specifying unit A13 specifies a channel which is unnecessary and can be released without any problem, from among the channels allocated to the radio interfaces A11.

To be specific, the unused channel specifying unit A13 specifies a channel other than channels used for communication links set as use communication links, as an unused channel candidate, from among the channels allocated to the radio interfaces A11.

To be more specific, firstly, the unused channel specifying unit A13 specifies the channels allocated to the respective radio interfaces A11 based on the information stored by the channel allocating unit A12. Next, with respect to each of the specified channels, the unused channel specifying unit A13 judges by using the own node channel use examining unit A14 whether a communication link using the channel is set as a use communication link, and thereby specifies unused channel candidates.

Moreover, with respect to each of the specified unused channel candidates, the unused channel specifying unit A13 queries each of the adjacent nodes whether to use the unused channel candidate as a use channel. After that, in the case of accepting, from each of the adjacent nodes, a response representing that the node does not use the unused channel candidate as a use channel, the unused channel specifying unit A13 specifies the unused channel candidate as an unused channel.

To be more specific, firstly, the unused channel specifying unit A13 judges whether a communication link using the unused channel candidate is established or not based on the link table stored by the link table storing unit A18.

As shown in FIG. 4, the link table includes entry information (record data) in which an adjacent node address, a channel and a link cost are associated with each other. An adjacent node address is the address (in this exemplary embodiment, an IP address) of an adjacent node having established a communication link with the node A1. A channel is a channel used by the communication link. A link cost is a value representing the cost of transferring data from the node A1 to the adjacent node by using the communication link.

That is to say, the unused channel specifying unit A13 judges whether entry information including the same channel as the unused channel candidate is included in the link table.

In a case that entry information including the same channel as the unused channel candidate is not included, the unused channel specifying unit A13 specifies the unused channel candidate as an unused channel.

On the other hand, in a case that entry information including the same channel as the unused channel candidate is included in the link table, the unused channel specifying unit A13 extracts the entry information including the same channel as the unused channel candidate.

Then, with respect to each of the extracted entry information, the unused channel specifying unit A13 judges whether the adjacent node having the adjacent node address included in the entry information is using the channel (i.e., is using the unused channel candidate as a used channel) in order to transfer data to the node A1, by using the adjacent node channel use examining unit A15. Then, the unused channel specifying unit A13 specifies an unused channel candidate which is not used by any of the adjacent nodes, as an unused channel.

The channel allocating unit A12 releases allocation of the channel specified as the unused channel by the unused channel specifying unit A13 to the radio interface A11 with the unused channel allocated. That is to say, the channel allocating unit A12 releases the unused channel candidate from the radio interface A11.

The own node channel use examining unit A14 has a function of judging with respect to each of the channels allocated to the radio interfaces A11 whether the channel is included in the first channel group (i.e., whether the channel is used for a communication link set as a use communication link used by the own node (the node A1) for transferring received data to the respective adjacent nodes).

The own node channel use examining unit A14 judges with respect to each of the channels allocated to the radio interfaces A11 whether entry information including the same channel as the channel is included in the routing table stored by the routing table storing unit A17.

In a case that entry information including the same channel as the judgment target channel is not included in the routing table, the own node channel use examining unit A14 judges that the judgment target channel is included in the first channel group. The own node channel use examining unit A14 transmits the result of the judgment to the unused channel specifying unit A13.

For example, it is assumed that a channel 0 is allocated to a first radio interface A11 and a channel 1 is allocated to a second radio interface A11 in the node A1. Moreover, it is assumed that the routing table storing unit A11 stores the routing table shown in FIG. 3.

In this case, entry information including the channel 0 is not included in the routing table. Therefore, the own node channel use examining unit A14 judges that the channel 0 allocated to the first radio interface A11 is not included in the first channel group (i.e., specifies as an unused channel candidate).

The adjacent node channel use examining unit A15 has a function of judging with respect to each of the unused channel candidates whether the unused channel candidate is included in the second channel group (i.e., whether the unused channel candidate is a channel (i.e., an unused channel) used in a communication link set as a use communication link used by each of the adjacent nodes (e.g., the node A2) for transferring received data to the node A1).

When a channel is released from the radio interface A11, a communication link using the channel is disconnected. Therefore, by judging whether a communication link using an unused channel candidate is used when an adjacent node transfers data to the node A1, it is possible to judge whether there arises a problem when an unused channel candidate is released from the radio interface A11.

In a case that, with respect to each of the unused channel candidates, a communication link using the unused channel candidate is established, the adjacent node channel use examining unit A15 transmits a channel use examination request message including (information for specifying) the unused channel candidate to a node (an adjacent node, e.g., the node A2) of the other side of the communication link.

In this exemplary embodiment, the adjacent node channel use examining unit A15 transmits a channel use examination request message by using a communication link established between the node A1 and an adjacent node. The adjacent node channel use examining unit A15 may be configured to transmit a channel use examination request message via a controlling communication network that is not shown in the drawings.

The adjacent node channel use examining unit A15 receives, from each of the adjacent nodes, a channel use examination response message that is a response to the channel use examination request message. This channel use examination response message includes information representing whether to use an unused channel candidate as a use channel.

In a case that, with respect to each of the unused channel candidates, all of the responses to the channel use examination request message including the unused channel candidate are information representing that the unused channel candidate is not used as a use channel, the adjacent node channel use examining unit A15 judges that the unused channel candidate is included in the second channel group. The adjacent node channel use examining unit A15 transmits the result of the judgment to the unused channel specifying unit A13.

Further, when receiving a channel use examination request message from an adjacent node (e.g., the node A1), the adjacent node channel use examining unit A25 of the node A2 judges whether an unused channel candidate included in the channel use examination request message is a channel (a use channel) used for a communication link set as a use communication link used for transferring data to the adjacent node (i.e., whether the unused channel candidate is used as a use channel).

That is to say, when queried by an adjacent node whether to use an unused channel candidate specified by the adjacent node as a use channel, the adjacent node channel use examining unit A25 judges whether a communication link established with the adjacent node and using the unused channel candidate is set as a use communication link.

To be specific, the adjacent node channel use examining unit A25 makes the judgment based on a routing table stored by the routing table storing unit A27. That is to say, in a case that entry information including the same channel as the unused channel candidate and including the address of the adjacent node as a next hop address is not included in the routing table, the adjacent node channel use examining unit A25 judges that the unused channel candidate is not used as a use channel.

On the other hand, in a case that entry information including the same channel as the unused channel candidate and including the address of the adjacent node as a next hop address is included in the routing table, the adjacent node channel use examining unit A25 judges that the unused channel candidate is being used as a use channel.

The adjacent node channel use examining unit A25 transmits a channel use examination response message representing the result of the judgment to the adjacent node (e.g., the node A1) having transmitted the channel use examination request message.

In this exemplary embodiment, the adjacent node channel use examining unit A15 also has the function of the adjacent node channel use examining unit A25. Moreover, the adjacent node channel use examining unit A25 also has the function of the adjacent node channel use examining unit A15.

The routing protocol unit A16 has a function of setting a communication path (i.e., a routing table) in a communication network (in this exemplary embodiment, a multi-hop communication network) configured by the node A1. The communication path is configured by an established communication link.

To be specific, the routing protocol unit A16 collects (acquires) topology information that represents the network topology of the communication network configured by the node A1. Then, the routing protocol unit A16 generates a routing table based on the collected topology information, and stores the generated routing table into the routing table storing unit A17.

In this exemplary embodiment, the routing protocol unit A16 sets a communication path in compliance with a routing protocol used in MANET (Mobile Adhoc NETwork), such as AODV (Ad Hoc On Demand Distance Vector) protocol and OLSR (Optimized Link State Routing) protocol.

The routing table storing unit A17 stores a routing table as described above.

For example, first (i.e., first-line) entry information shown in FIG. 3 represents that, when the node A1 receives data in which a destination address 10.1.1.1 is set as a destination, the node A1 transfers the data to an adjacent node having a next hop address 10.1.1.1. Moreover, the entry information represents that a link cost representing the cost required when the node A1 transfers the data to the adjacent node is 2 and a channel used when the node A1 transfers the data to the adjacent node is the channel 1.

Likewise, third entry information shown in FIG. 3 represents that, when the node A1 receives data in which a destination address 10.4.4.4 is set as a destination, the node A1 transfers the data to an adjacent node having a next hop address 10.3.3.3. Moreover, the entry information represents that a link cost representing the cost required when the node A1 transfers the data to the adjacent node is 3 and a channel used when the node A1 transfers the data to the adjacent node is the channel 1.

The link table storing unit A18 stores a link table as described above. Every time the radio interface A11 establishes a communication link with a radio interface included by an adjacent node, the link table storing unit A18 adds entry information corresponding to the communication link to the link table.

For example, first entry information shown in FIG. 4 represents that a communication link using the channel 0 as a channel is established between the node A1 and an adjacent node having an adjacent node address 10.1.1.1. Moreover, the entry information represents that a link cost representing the cost required when the node A1 transfers data to the adjacent node by using the communication link is 4.

Likewise, second entry information shown in FIG. 4 represents that a communication link using the channel 1 as a channel is established between the node A1 and the adjacent node having an adjacent node address 10.1.1.1. Moreover, the entry information represents that a link cost representing the cost required when the node A1 transfers data to the adjacent node by using the communication link is 2.

Thus, there is a case that a plurality of communication links established with the same adjacent node exist.

In this exemplary embodiment, in a case that a plurality of communication links established with the same adjacent node exist, the node A1 transfers data to the adjacent node by using a communication link in which a link cost is the minimum among the communication links. That is to say, in a case that a plurality of communication links established with the same adjacent node exist, the node A1 sets a communication link in which a link cost is the minimum among the communication links, as a use communication link.

That is to say, in a case that a plurality of communication links established with the adjacent node having the adjacent node address 10.1.1.1 as shown in FIG. 4 exist, the node A1 sets the communication link using the channel 1 as a use communication link because the link cost is the minimum.

The node A1 receives data from the adjacent node via (by using) the communication link established with the adjacent node. The node A1 also generates data. Then, the node A1 acquires entry information including the address of the destination of the data (the received data or the generated data) as a destination address, from the routing table stored by the routing table storing unit A17. Next, the node A1 transfers the data to an adjacent node having a next hop address included in the acquired entry information, via a communication link (a use communication link) using a channel included in the entry information.

(Operation)

Next, an operation of the communication system according to the first exemplary embodiment will be described.

An operation of the node A1 when the node A1 specifies an unused channel and releases the specified unused channel, and an operation of the node A2 when the node A2 receives a channel use examination request message will be described in detail, respectively.

In this exemplary embodiment, it is assumed that the node A1 is located in the same position as the node B in the same network topology as the network topology 101 shown in FIG. 1A. Moreover, it is assumed that the node A2 is located in the same position as the node D in the network topology.

In addition, it is assumed that the routing table stored by the routing table storing unit A17 of the node A1 is the routing table shown in FIG. 3 and the link table stored by the link table storing unit A18 of the node A1 is the link table shown in FIG. 4. Moreover, it is assumed that the routing table stored by the routing table storing unit A27 of the node A2 is the routing table shown in FIG. 5.

Besides, it is assumed that the channel 0 is allocated to a first radio interface A11 of the node A1 and the channel 1 is allocated to a second radio interface A11 of the node A1.

At first, with reference to FIGS. 6 and 7, an operation of the node A1 when the node A1 specifies an unused channel and releases the specified unused channel will be described.

Figure 6:
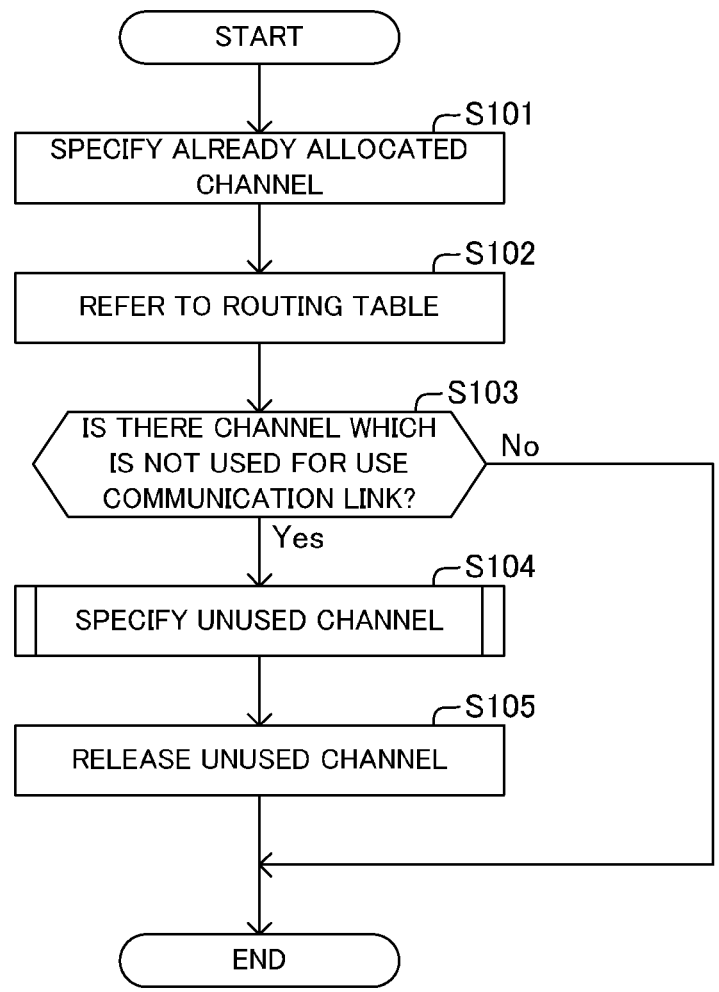
FIG. 6 is a flowchart showing a program executed for releasing an unused channel by the node according to the first exemplary embodiment of the present invention.

The unused channel specifying unit A13 of the node A1 queries the channel allocating unit A12 and thereby specifies channels (already-allocated channels) having been allocated to the radio interfaces A11 (step S101 of FIG. 6).

Next, the unused channel specifying unit A13 specifies a channel (i.e., a channel which is not used for transferring data in the own node (i.e., the node A1)) other than a channel used in a communication link set as a use communication link, from among the already-allocated channels, by using the own node channel use examining unit A14.

That is to say, the unused channel specifying unit A13 refers to the routing table (step S102 of FIG. 6), and judges whether a channel other than a channel used in a communication link set as a use communication link exists in the already-allocated channels (step S103 of FIG. 6).

To be specific, the own node channel use examining unit A14 judges whether each of the channels allocated to the radio interfaces A11 is included in any of the entry information included in the routing table. The own node channel use examining unit A14 transmits the result of the judgment to the unused channel specifying unit A13.

According to the above assumptions, each of the entry information included in the routing table includes only the channel 1 as a channel as shown in FIG. 3. That is to say, the own node channel use examining unit A14 judges that the channel 0 is not included in any of the entry information included in the routing table.

Therefore, the unused channel specifying unit A13 judges that a channel other than a channel used in a communication link set as a use communication link exists in the already-allocated channels. That is to say, the node A1 judges "Yes" at step 103 of FIG. 6 and proceeds to step A104.

In a case that a channel other than a channel used in a communication link set as a use communication link does not exist in the already-allocated channels, the unused channel specifying unit A13 judges "No" at step S103 of FIG. 6 and ends the process shown in FIG. 6.

Figure 7:
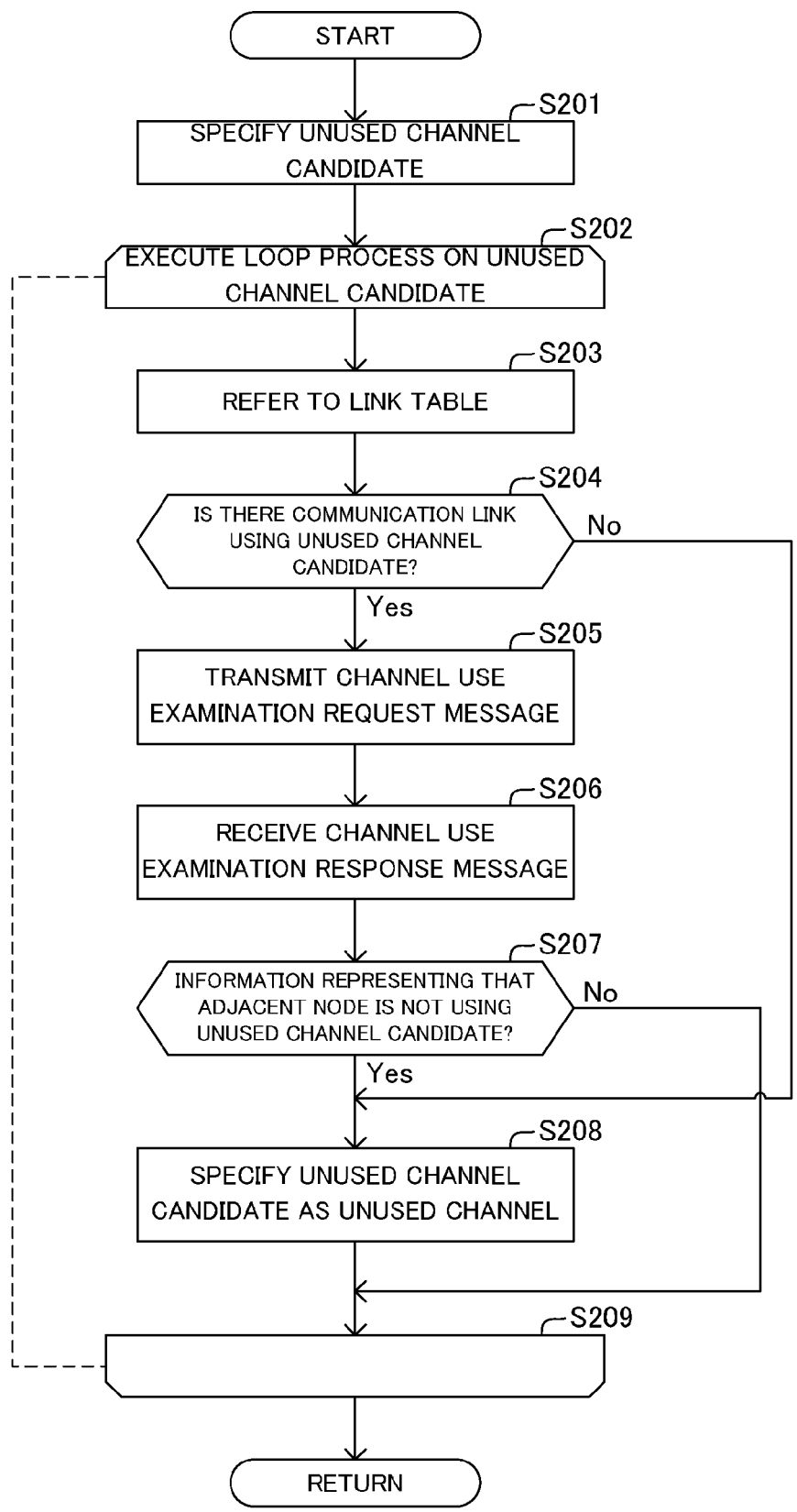
FIG. 7 is a flowchart showing a program executed for specifying an unused channel by the node according to the first exemplary embodiment of the present invention.

Next, the unused channel specifying unit A13 executes a process shown in FIG. 7 in order to specify an unused channel.

The unused channel specifying unit A13 specifies channels other than a channel used for a communication link set as a use communication link from among the already-allocated channels, as unused channel candidates (step S201 of FIG. 7).

Next, the unused channel specifying unit A13 executes a loop process (steps S202 to step S209) on each of the unused channel candidates having been specified one by one as a process target.

In the loop process, firstly, the unused channel specifying unit A13 refers to the link table (step S203 of FIG. 7) and judges whether a communication link using a process target unused channel candidate as a channel exists (is established) (step S204 of FIG. 7).

According to the above assumptions, among the entry information included in the link table, first entry information and fourth entry information include the channel 0 as a channel as shown in FIG. 4. Therefore, when a process target unused channel candidate is the channel 0, the unused channel specifying unit A13 judges that a communication link using the process target unused channel candidate as a channel exists Therefore, the unused channel specifying unit A13 judges "Yes" at step S204 of FIG. 7 and proceeds to step S205. Moreover, in this case, the unused channel specifying unit A13 acquires adjacent node addresses (herein, 10.1.1.1 and 10.4.4.4) included in the entry information including the process target unused channel candidate as a channel.

In a case that a communication link using the process target unused channel candidate as a channel does not exist, the unused channel specifying unit A13 judges "No" at step S204 of FIG. 7 and proceeds to step S208 of FIG. 7.

Next, with respect to each of the acquired adjacent node addresses, the unused channel specifying unit A13 judges whether an adjacent node having the adjacent node address uses the unused channel candidate as a use channel for transferring data to the node A1, by using the adjacent node channel use examining unit A15.

That is to say, the adjacent node channel use examining unit A15 transmits a channel use examination request message to each of adjacent nodes having the acquired adjacent node addresses (step S205 of FIG. 7). This channel use examination request message includes information for specifying the process target unused channel candidate and information representing the address of the own node (the node A1).

After that, the adjacent node channel use examining unit A15 receives channel use examination response messages from the respective adjacent nodes that are the destinations of transmission of the channel use examination request message (step S206 of FIG. 7).

Then, the adjacent node channel use examining unit A15 judges whether all of the received channel use examination response messages are information representing that the unused channel candidate is not used as a use channel (i.e., whether the adjacent nodes do not use (are not using) the unused channel candidate) (step S207 of FIG. 7).

In a case that the adjacent nodes do not use the unused channel candidate, the adjacent node channel use examining unit A15 judges "Yes" and proceeds to step S208. Then, the unused channel specifying unit A13 specifies the process target unused channel candidate as an unused channel (step S208 of FIG. 7).

On the other hand, in a case that any of the adjacent nodes is using the unused channel candidate, the adjacent node channel use examining unit A15 judges "No" and proceeds to step S209 without specifying the unused channel candidate as an unused channel.

Then, the unused channel specifying unit A13 executes the loop process (step S202 to step S209) on all of the specified unused channel candidates, and thereafter proceeds to step S105 of FIG. 6.

Next, the channel allocating unit A12 releases allocation of an unused channel to the radio interface A11 to which a channel specified as the unused channel by the unused channel specifying unit A13 is allocated (i.e., releases the unused channel from the radio interface A11) (step S105 of FIG. 6).

Next, with reference to FIG. 8, an operation of the node A2 when the node A2 receives a channel use examination request message will be described.

Figure 8:
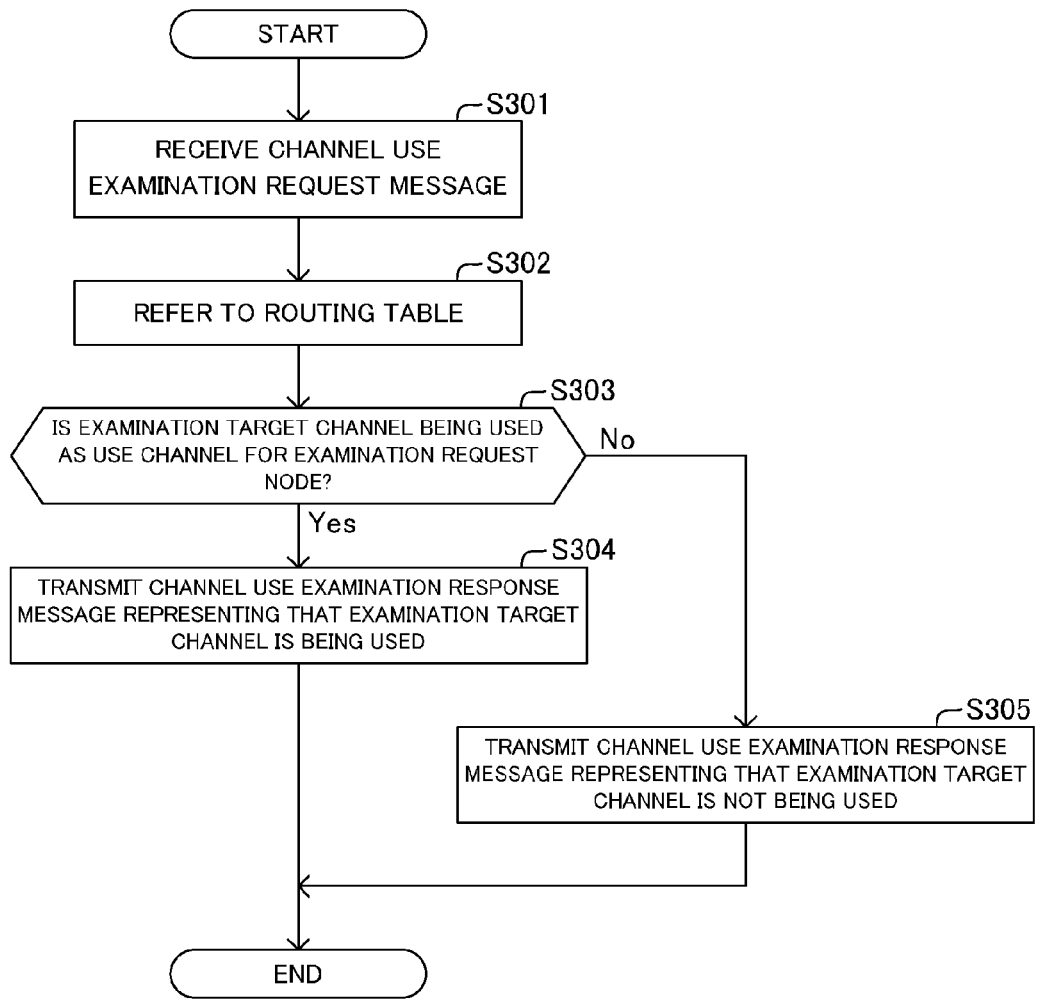
FIG. 8 is a flowchart showing a program executed for transmitting a channel use examination response message by the node according to the first exemplary embodiment of the present invention.

At first, the adjacent node channel use examining unit A25 of the node A2 receives a channel use examination request message from the node A1 (step S301 of FIG. 8). This channel use examination request message includes information for specifying an unused channel candidate (an examination target channel) and information representing the address of the node A1 (an examination requesting node) as described above.

Next, the adjacent node channel use examining unit A25 refers to the routing table (step S302 of FIG. 8), and judges whether entry information including the same channel the examination target channel and including the address of the examination requesting node as a next hop address is included in the routing table (i.e., the examination target channel is used in a use communication link used for transferring data to the examination requesting node) (step S303 of FIG. 8).

According to the above assumptions, the routing table stored by the routing table storing unit A27 is the routing table shown in FIG. 5. Therefore, this routing table does not include entry information including the channel 0 as a channel and including 10.2.2.2 as a next hop address.

Therefore, in a case that the examination target channel is the channel 0 and the address of the examination requesting node (herein, the node A1) is 10.2.2.2, the adjacent node channel use examining unit A25 judges "No" at step S303 of FIG. 8, and proceeds to step S305.

Then, the adjacent node channel use examining unit A25 transmits a channel use examination response message representing that the examination target channel is not being used (the unused channel candidate is not being used as a use channel) to the adjacent node (the examination requesting node, i.e., the node A1) having transmitted the channel use examination request message.

On the other hand, in a case that entry information including the same channel as the examination target channel and including the address of the examination requesting node as a next hop address is included in the routing table, the adjacent node channel use examining unit A25 judges "Yes" at step S303 of FIG. 8 and proceeds to step S304.

Then, the adjacent node channel use examining unit A25 transmits a channel use examination response message representing that the examination target channel is being used (i.e., the unused channel candidate is being used as the unused channel) to the adjacent node (the examination requesting node, i.e., the node A1) having transmitted the channel use examination request message.

As described above, according to the node device A1 of the first exemplary embodiment of the present invention, the node device A1 specifies a channel which is not used when the node device A1 transfers data to the adjacent node device A2 (i.e., a channel other than a channel used in a communication link set as a use communication link), as an unused channel. Then, the node device A1 releases allocation of the specified unused channel to the radio interface A11. As a result, it is possible to prevent that a state in which a channel is wastefully allocated to the radio interface A11 is kept.

Further, according to the node device A1 of the first exemplary embodiment of the present invention, the node device A1 specifies a channel that the adjacent node device A2 does not use when transferring data to the node device A1 from among channels used when the node device A1 transfers data to the adjacent node device A2, as an unused channel. Therefore, it is possible to prevent that allocation of a channel used when the adjacent node device A2 transfers data to the node device A1 to the radio interface A11 is released.

<Second Exemplary Embodiment>

Next, a communication system according to a second exemplary embodiment of the present invention will be described. The communication system according to the second exemplary embodiment is different from the communication system according to the first exemplary embodiment in specifying a channel other than a channel used in a communication link set as an auxiliary communication link, as an unused channel. Therefore, a description will be made below focusing on the different point.

Figure 9:
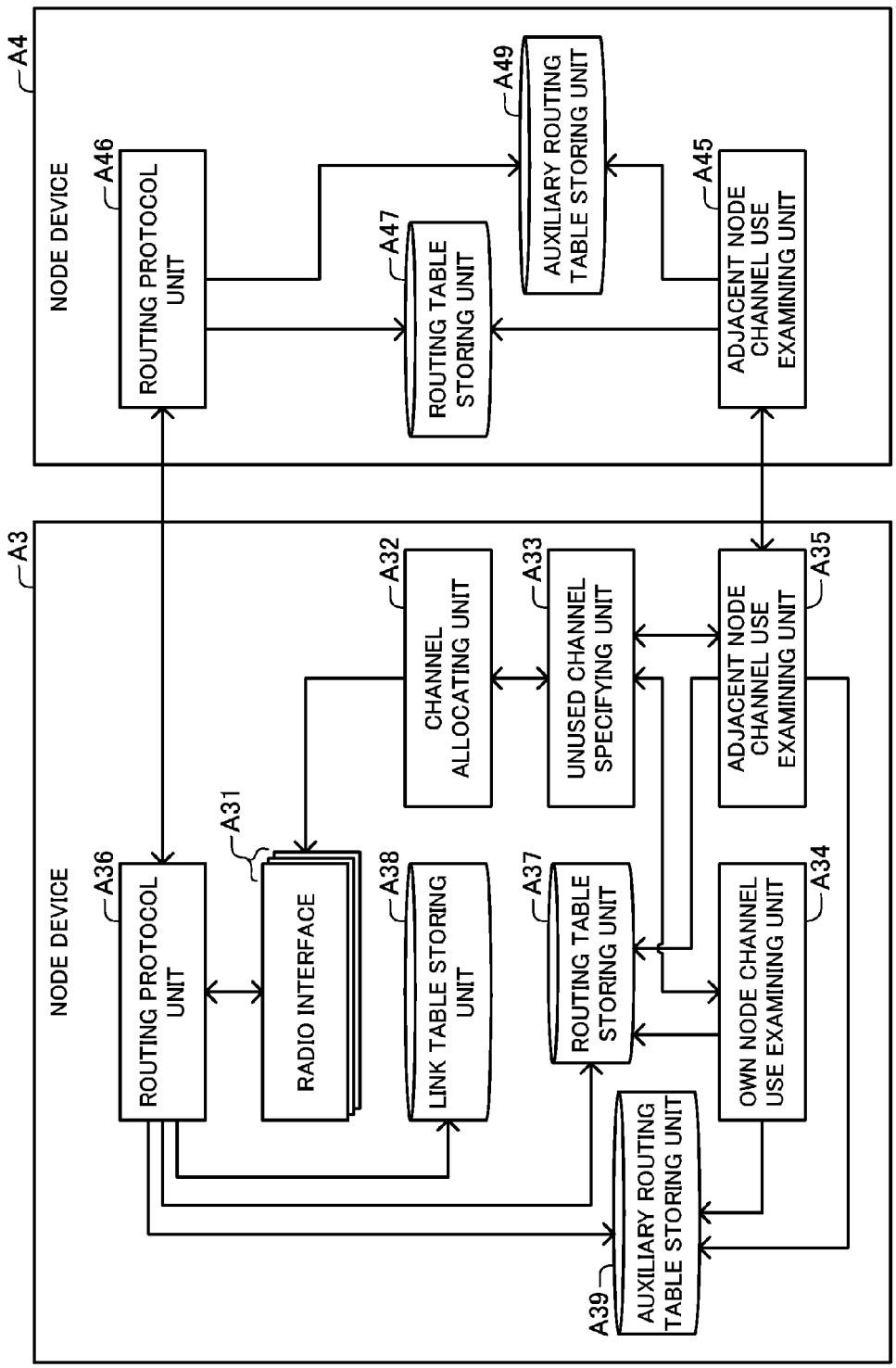
FIG. 9 is a block diagram showing the overview of a function of a communication system according to a second exemplary embodiment of the present invention.

With reference to FIG. 9, the communication system according to the second exemplary embodiment of the present invention includes a node A3 and a node A4 instead of the node A1 and the node A2 of the first exemplary embodiment. The communication system according to the second exemplary embodiment also includes another node that is not shown in the drawings.

Each of the nodes has the same configuration and function as the node A3. Therefore, only the node A3 will be described below. A configuration and function of the node A4 is partially omitted and shown in FIG. 9, but the node A4 has the same configuration and function as the node A3.

The node A3 is equipped with a plurality of radio interfaces A31 which are the same as the radio interfaces A11 in the first exemplary embodiment. The node A3 may be equipped with only one radio interface A31.

(Function)

A function of the node A3 includes a channel allocating unit (a channel allocation releasing means) A32, an unused channel specifying unit (part of an unused channel specifying means) A33, an own node channel use examining unit (part of the unused channel specifying means) A34, an adjacent node channel use examining unit (part of the unused channel specifying means) A35, a routing protocol unit A36, a routing table storing unit (a routing table storing means) A37, a link table storing unit A38, and an auxiliary routing table storing unit (an auxiliary routing table storing means) A39.

Further, a function of the node A4 includes an adjacent node channel use examining unit (part of an unused channel specifying means) A45, a routing protocol unit A46, a routing table storing unit A47, and an auxiliary routing table storing unit A49.

The channel allocating unit A32, the routing protocol unit A36, the routing table storing unit A37, the link table storing unit A38, the routing protocol unit A46 and the routing table storing unit A47 are the same as the channel allocating unit A12, the routing protocol unit A16, the routing table storing unit A17, the link table storing unit A18, the routing protocol unit A26 and the routing table storing unit A27 in the first exemplary embodiment, respectively.

The auxiliary routing table storing unit A39 stores an auxiliary routing table as shown in FIG. 10. Like the routing table, the auxiliary routing table includes entry information (record data) in which a destination address, a next hop address, a link cost and a channel are associated.

The auxiliary routing table is referred to when a communication path at normal time (i.e., a communication path determined by the routing table) cannot be used due to disconnection of a communication link, a failure of a node, and so on.

Herein, a next hop address and a channel configure auxiliary communication link specification information for specifying an auxiliary communication link set for the destination of data. An auxiliary communication link is an auxiliary communication link set for the destination of received data.

For example, first (i.e., first-line) entry information shown in FIG. 10 represents that, when the node A3 receives data in which a destination address 10.1.1.1 is set as a destination, the node A3 transfers the data to an adjacent node having a next hop address 10.1.1.1. Moreover, the entry information represents that a link cost representing the cost required when the node A3 transfers the data to the adjacent node is 4 and a channel used when the node A3 transfers the data to the adjacent node is the channel 0.

Likewise, fourth entry information shown in FIG. 10 represents that, when the node A3 receives data in which a destination address 10.5.5.5 is set as a destination, the node A3 transfers the data to an adjacent node having a next hop address 10.4.4.4. Moreover, the entry information represents that a link cost representing the cost required when the node A3 transfers the data to the adjacent node is 5 and a channel used when the node A3 transfers the data to the adjacent node is the channel 0.

The unused channel specifying unit A33 specifies an unused channel by using the own node channel use examining unit A34 and the adjacent node channel use examining unit A35.

An unused channel is a channel which is not included in either a third channel group or a fourth channel group among channels allocated to the radio interfaces A31. The third channel group is composed of channels used for communication links set as use communication links each used by the node A3 for transferring received data to each of the adjacent nodes (e.g., the node A4) and channels used for communication links each set as auxiliary communication links of the use communication links.

Herein, a use communication link is determined in a routing table stored by the routing table storing unit A37. Moreover, an auxiliary communication link is determined in an auxiliary routing table stored by the auxiliary routing table storing unit A39.

The fourth channel group is composed of channels (use channels) used for communication links set as use communication links each used by each of the adjacent nodes (e.g., the node A4) for transferring received data to the node A3 and channels (auxiliary channels) used for communication links set as auxiliary communication links of the use communication links.

The own node channel use examining unit A34 has a function of judging with respect to each of the channels allocated to the radio interfaces A31 whether the channel is included in the third channel group or not.

The own node channel use examining unit A34 judges with respect to each of the channels allocated to the radio interfaces A31 whether entry information including the same channel as the allocated channel is included in the routing table stored by the routing table storing unit A37 or the auxiliary routing table stored by the auxiliary routing table storing unit A39.

In a case that entry information including the same channel as the judgment target channel is not included in either the routing table or the auxiliary routing table, the own node channel use examining unit A34 judges the judgment target channel is included in the third channel group. The own node channel use examining unit A34 transmits the result of the judgment to the unused channel specifying unit A33.

The unused channel specifying unit A33 specifies an unused channel candidate based on the result of the judgment by the own node channel use examining unit A34. That is to say, the unused channel specifying unit A33 specifies a channel judged not to be included in the third channel group among the channels allocated to the radio interfaces A31, as an unused channel candidate.

For example, it is assumed that the channel 0 is allocated to a first radio interface A31 and the channel 1 is allocated to a second radio interface A31 in the node A3. Moreover, it is assumed that the routing table storing unit A37 stores the routing table shown in FIG. 3 and the auxiliary routing table storing unit A39 stores the auxiliary routing table shown in FIG. 10.

In this case, entry information including the channel 1 is included in the routing table. Moreover, entry information including the channel 0 is included in the auxiliary routing table. Therefore, the own node channel use examining unit A34 judges that both the channel 0 and the channel 1 allocated to the radio interfaces A31 are included in the third channel group (i.e., does not specify as unused channel candidates).

The adjacent node channel use examining unit A35 has a function of judging with respect to each of the unused channel candidates whether the unused channel candidate is included in the fourth channel group.

In a case that, for each of the unused channel candidates, a communication link using the unused channel candidate is established, the adjacent node channel use examining unit A35 transmits a channel use examination request message including (information for specifying) the unused channel candidate to a node (an adjacent node, e.g., the node A4) of the other side of the communication link.

The adjacent node channel use examining unit A35 receives, from each of the adjacent nodes, a channel use examination response message that is a response to the channel use examination request message. The adjacent node channel use examining unit A35 judges whether the unused channel candidate is included in the fourth channel group, based on the channel use examination response message having been received. The adjacent node channel use examining unit A35 transmits the result of the judgment to the unused channel specifying unit A33.

Further, when receiving a channel use examination request message from an adjacent node (e.g., the node A3), the adjacent node channel use examining unit A45 of the node A4 judges whether an unused channel candidate included in the channel use examination request message is a channel (a use channel or an auxiliary channel) used for a communication link set as a use communication link or auxiliary link used for transferring data to the adjacent node (i.e., the unused channel candidate is used as the use channel or the auxiliary channel).

That is to say, when queried by the adjacent node whether to use an unused channel candidate specified by the adjacent node as a use channel or an auxiliary channel, the adjacent node channel use examining unit A45 judges whether a communication link established with the adjacent node and using the unused channel candidate is set as a use communication link or an auxiliary communication link.

To be specific, the adjacent node channel use examining unit A45 makes the judgment based on a routing table stored by the routing table storing unit A47 or an auxiliary routing table stored by the auxiliary routing table storing unit A49.

That is to say, in a case that entry information including the same channel as the unused channel candidate and including the address of the adjacent node as a next hop address is not included in either the routing table or the auxiliary routing table, the adjacent node channel use examining unit A45 judges that the unused channel candidate is not used as either a use channel or an auxiliary channel.

On the other hand, in a case that entry information including the same channel as the unused channel candidate and including the address of the adjacent node as a next hop address is included in the routing table or the auxiliary routing table, the adjacent node channel use examining unit A45 judges that the unused channel candidate is being used as a use channel or an auxiliary channel.

The adjacent node channel use examining unit A45 transmits a channel use examination response message representing the result of the judgment to the adjacent node (e.g., the node A3) having transmitted the channel use examination request message.

In this exemplary embodiment, the adjacent node channel use examining unit A35 also has the function of the adjacent node channel use examining unit A45. The adjacent node channel use examining unit A45 also has the function of the adjacent node channel use examining unit A35.

The routing protocol unit A36 has a function of setting a communication path (i.e., a routing table or an auxiliary routing table) in a communication network (in this exemplary embodiment, a multi-hop communication network) configured by the node A3. A communication path is configured by an established communication link.

To be specific, the routing protocol unit A36 collects (acquires) topology information representing a network topology of a communication network configured by the node A3. Then, the routing protocol unit A36 generates a routing table or an auxiliary routing table based on the collected topology information, and stores the generated routing table into the routing table storing unit A37 and also stores the generated auxiliary routing table into the auxiliary routing table storing unit A39.

The node A3 receives data from an adjacent node via (by using) a communication link established with the adjacent node. The node A3 also generates data. Then, the node A3 acquires entry information including the address of the destination of the data (the received data or the generated data) as a destination address, from the routing table stored by the routing table storing unit A37. Next, the node A3 transfers the data to an adjacent node having a next hop address included in the acquired entry information, via a communication link (a use communication link) using a channel included in the entry information.

In a case that a failure is occurring in the communication path using the use communication link, the node A3 acquires entry information including the address of the destination of data as a destination address, from the auxiliary routing table stored by the auxiliary routing table storing unit A39. Next, the node A3 transfers the data to an adjacent node having a next hop address included in the acquired entry information, via a communication link (an auxiliary communication link) using a channel included in the entry information.

(Operation)

Next, an operation of the communication system according to the second exemplary embodiment will be described.

An operation of the node A3 when the node A3 specifies an unused channel and releases the specified unused channel, and an operation of the node A4 when the node A4 receives a channel use examination request message will be described in detail, respectively.

In this exemplary embodiment, it is assumed that the node A3 is located in the same position as the node B in the same network topology as the network topology 101 shown in FIG. 1A. Moreover, it is assumed that the node A4 is located in the same position as the node D in the network topology.

In addition, it is assumed that the routing table stored by the routing table storing unit A37 of the node A3 is the routing table shown in FIG. 3 and the auxiliary routing table stored by the auxiliary routing table storing unit A39 of the node A3 is the routing table shown in FIG. 10. Moreover, it is assumed that the routing table stored by the routing table storing unit A47 of the node A4 is the routing table shown in FIG. 5 and the auxiliary routing table stored by the auxiliary routing table storing unit A49 of the node A4 is a routing table shown in FIG. 11.

Besides, it is assumed that the channel 0 is allocated to the first radio interface A31 of the node A3 and the channel 1 is allocated to the second radio interface A31 of the node A3.

At first, with reference to FIG. 12, an operation of the node A3 when the node A3 specifies an unused channel and releases the specified unused channel will be described.

Figure 12:
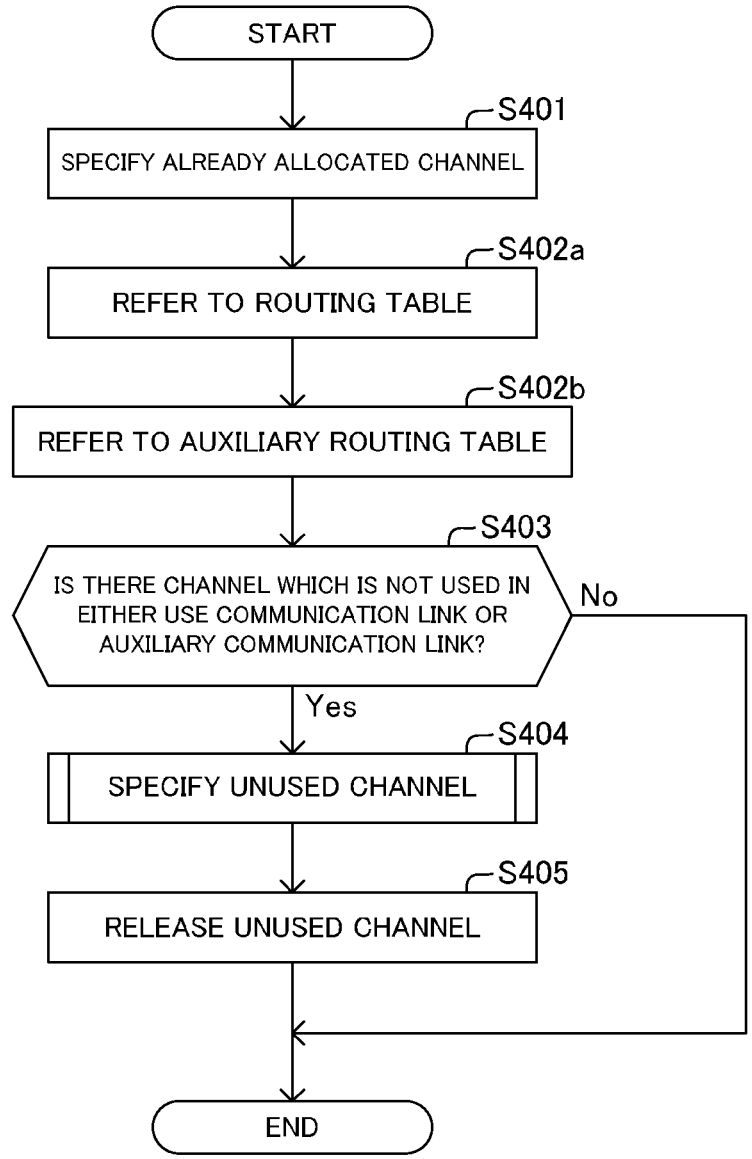
FIG. 12 is a flowchart showing a program executed for releasing an unused channel by the node according to the second exemplary embodiment of the present invention.

Processes at steps S401, S402a, S404 and S405 of FIG. 12 are the same as the processes at steps S101, S102, S104 and S105 in FIG. 6, respectively. Therefore, a description thereof will be omitted.

That is to say, after referring to the routing table (step S402a of FIG. 12), the unused channel specifying unit A33 refers to the auxiliary routing table (step S402b of FIG. 12), and judges whether a channel other than a channel used in a communication link set as a use communication link or an auxiliary communication link exists among the already-allocated channels (step S403 of FIG. 12).

To be specific, the own node channel use examining unit A34 judges whether each of the channels allocated to the radio interfaces A31 is included in any of the entry information included in the routing table or the auxiliary routing table. The own node channel use examining unit A34 transmits the result of the judgment to the unused channel specifying unit A33.

According to the above assumptions, each of the entry information included in the routing table includes the channel 1 as a channel as shown in FIG. 3. Moreover, each of the entry information included in the auxiliary routing table includes the channel 0 as a channel as shown in FIG. 10. That is to say, the own node channel use examining unit A34 judges that both the channel 0 and the channel 1 are included in the entry information included in the routing table or the auxiliary routing table.

Therefore, the unused channel specifying unit A33 judges that a channel other than a channel used in a communication link set as a use communication link or an auxiliary communication link does not exist among the already-allocated channels. That is to say, the node A3 judges "No" at step 403 of FIG. 12 and ends the process.

In a case that a channel other than a channel used in a communication link set as a use communication link or an auxiliary communication link exists in the already-allocated channels, the unused channel specifying unit A33 judges "Yes" to proceed to step S404 of FIG. 12 and, in the same manner as the node A1 in the first exemplary embodiment, executes the process shown in FIG. 7 and the process at step S405.

Next, with reference to FIG. 13, an operation of the node A4 when the node A4 receives a channel use examination request message will be described.

Figure 13:
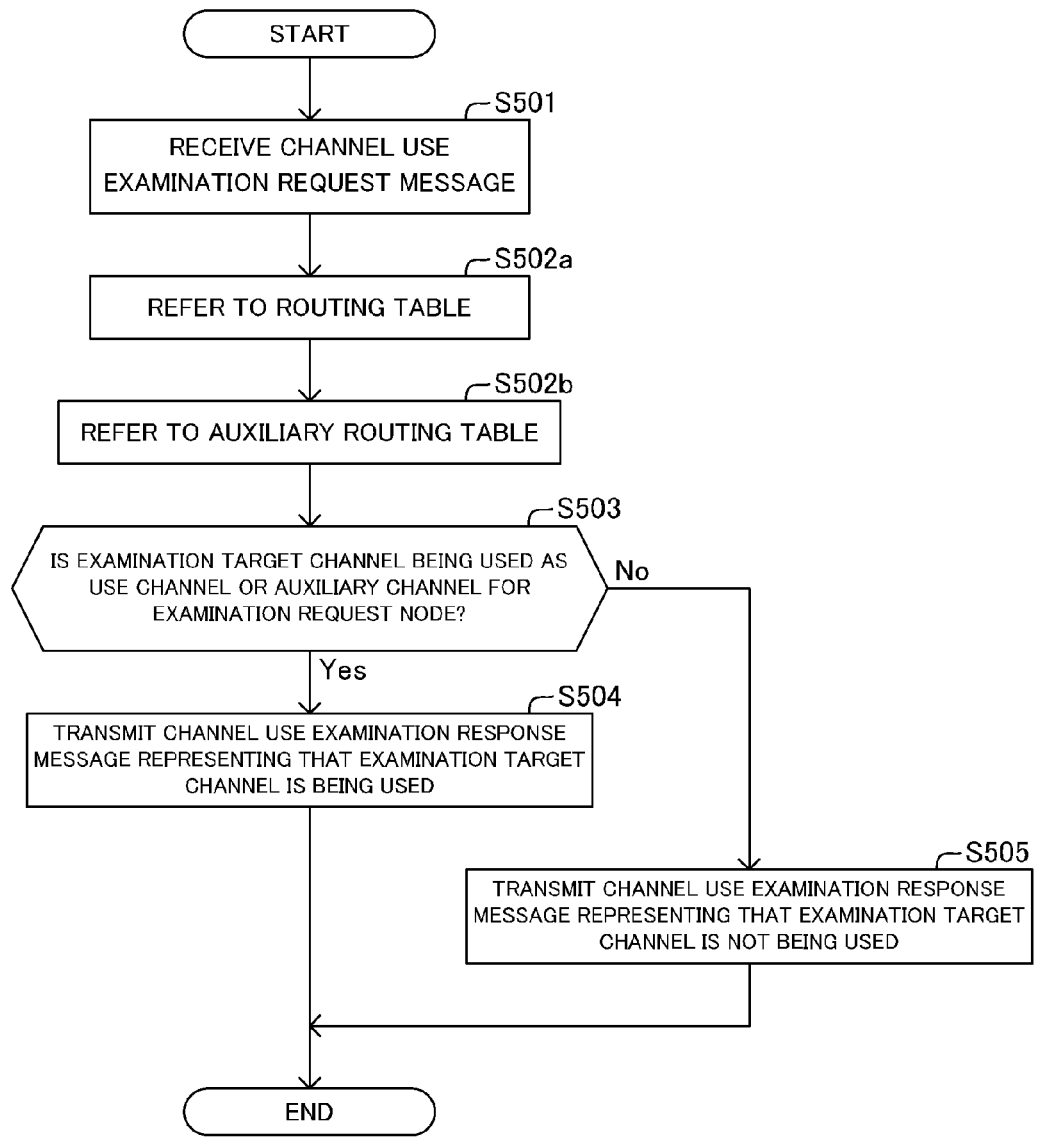
FIG. 13 is a flowchart showing a program executed for transmitting a channel use examination response message by a node according to the second exemplary embodiment of the present invention.

Processes at steps S501, S502a, S504 and S505 in FIG. 13 are the same as the processes at step S301, S302, S304 and S305 in FIG. 8, respectively. Therefore, a description thereof will be omitted.

After referring to the routing table (step S502a of FIG. 13), the adjacent node channel use examining unit A45 of the node A4 refers to the auxiliary routing table (step S502b of FIG. 13), and judges whether entry information including the same channel as the examination target channel and including the address of the examination requesting node as a next hop address is included in the routing table or the auxiliary routing table (i.e., whether the examination target channel is used in a use communication link used for transferring data to the examination requesting node or an auxiliary communication link) (step S503 of FIG. 13).

According to the above assumptions, the routing table stored by the routing table storing unit A47 is the routing table shown in FIG. 5. Moreover, the auxiliary routing table stored by the auxiliary routing table storing unit A49 is the routing table shown in FIG. 11. Therefore, this auxiliary routing table includes entry information including the channel 0 as a channel and including 10.2.2.2 as a next hop address.

Therefore, in a case that the examination target channel is the channel 0 and the address of the examination requesting node (herein, the node A3) is 10.2.2.2, the adjacent node channel use examining unit A45 judges "Yes" at step S503 of FIG. 13, and proceeds to step S504.

In a case that entry information including the same channel as the examination target channel and including the address of the examination requesting node as a next hop address is not included in either the routing table or the auxiliary routing table, the adjacent node channel use examining unit A45 judges "No" at step S503 of FIG. 13 and proceeds to step S505.

As described above, according to the node A3 of the second exemplary embodiment of the present invention, it is possible to produce the same actions and effects as the node A1 of the first exemplary embodiment.

Further, according to the node A3 of the second exemplary embodiment of the present invention, the node A3 specifies a channel other than a channel used in a communication link set as a use communication link and other than a channel used in a communication link set as an auxiliary communication link, as an unused channel. Therefore, it is possible to prevent that allocation of the channel used in the communication link set as the auxiliary communication link is released.

In addition, the node A3 of the second exemplary embodiment of the present invention specifies a channel other than an auxiliary channel which is a channel used in a communication link set as an auxiliary communication link which is an auxiliary communication link of a use communication link used when each of the adjacent nodes transfers received data to the node A3, as an unused channel.

According to this, it is possible to prevent that allocation, to the radio interface A31, of the channel used in the auxiliary communication link of the use communication link used when an adjacent node transfers data to the node A3 is released.

Consequently, when a certain channel is used for an auxiliary communication path though the channel is not used for a communication path at normal time, it is possible to prevent the channel from being released. As a result, it is possible to prevent that a state in which a channel is wastefully allocated to the radio interface A11 is kept, while securing an auxiliary communication path.

<Third Exemplary Embodiment>

Next, a communication system according to a third exemplary embodiment of the present invention will be described. The communication system according to the third exemplary embodiment is different from the communication system according to the first exemplary embodiment in specifying a channel other than a minimum cost channel for each of the adjacent nodes, as an unused channel. Therefore, a description will be made below focusing on the different point.

Figure 14:
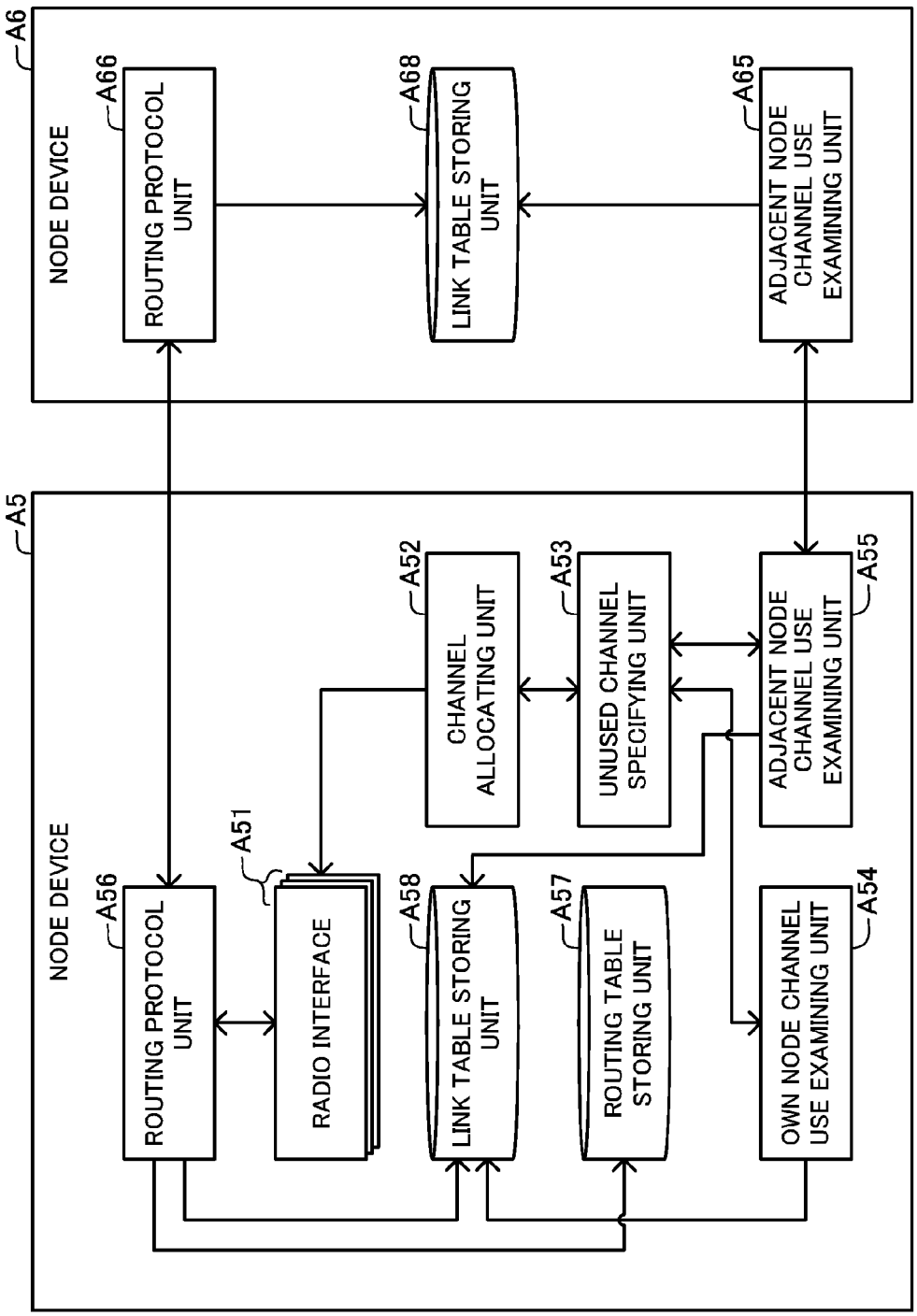
FIG. 14 is a block diagram showing the overview of a function of a communication system according to a third exemplary embodiment of the present invention.

With reference to FIG. 14, the communication system according to the third exemplary embodiment of the present invention includes a node A5 and a node A6 instead of the node A1 and the node A2 in the first exemplary embodiment. The communication system according to the third exemplary embodiment also includes another node that is not shown in the drawings.

Each of the nodes has the same configuration and function as the node A5. Therefore, only the node A5 will be described below. In FIG. 14, a configuration and function of the node A6 is partially omitted and shown, but the node A6 has the same configuration and function as the node A5 actually.

The node A5 is equipped with a plurality of radio interfaces A51 which are the same as the radio interfaces A11 of the first exemplary embodiment. The node A5 may be equipped with only one radio interface A51.

(Function)

The function of the node A5 includes a channel allocating unit (a channel allocation releasing means) A52, an unused channel specifying unit (part of an unused channel specifying means) A53, an own node channel use examining unit (part of the unused channel specifying means) A54, an adjacent node channel use examining unit (part of the unused channel specifying means) A55, a routing protocol unit A56, a routing table storing unit (a routing table storing means) A57, and a link table storing unit A58.

Further, the function of the node A6 includes an adjacent node channel use examining unit (part of an unused channel specifying unit) A65, a routing protocol unit A66, and a link table storing unit A68.

The channel allocating unit A52, the routing protocol unit A56, the routing table storing unit A57, the link table storing unit A58 and the routing protocol unit A66 are the same as the channel allocating unit A12, the routing protocol unit A16, the routing table storing unit A17, the link table storing unit A18 and the routing protocol unit A26, respectively.

The unused channel specifying unit A53 specifies an unused channel by using the own node channel use examining unit A54 and the adjacent node channel use examining unit A55. An unused channel is a channel which is not included in either a fifth channel group or a sixth channel group among the channels allocated to the radio interfaces A51.

The fifth channel group is composed of minimum cost channels for the respective adjacent nodes. This minimum cost channel is a channel used by a communication link whose link cost representing the cost required when an own node (in this exemplary embodiment, the node A5) transfers data to an adjacent node (e.g., the node A6) is the minimum among communication links established with the adjacent node.

The node A5 is configured to, in a case that a plurality of communication links established with the same adjacent node exist, transfer data to the adjacent node by using a communication link whose link cost is the minimum among the plurality of communication links. That is to say, a communication link set as a use communication link is a communication link using the minimum cost channel.

Therefore, in a case that a channel other than the minimum cost channel is specified as an unused channel candidate, the unused channel candidate is a channel other than a channel used for a communication link set as a use communication link.

The sixth channel group is composed of minimum cost channels for the respective adjacent nodes. This minimum cost channel is a channel used by a communication link whose link cost representing the cost required when an adjacent node (e.g., the node A6) transfers data to an own node (in this exemplary embodiment, the node A5) is the minimum among communication links established with the adjacent node.

The own node channel use examining unit A54 has a function of judging with respect to each of the channels allocated to the radio interfaces A51 whether the channel is included in the fifth channel group.

The own node channel use examining unit A54 specifies minimum cost channels for the respective adjacent nodes based on a link table stored by the link table storing unit A58. Moreover, the own node channel use examining unit A54 judges with respect to each of the channels allocated to the radio interfaces A51 whether the channel is the same as any of the specified minimum cost channels.

In a case that a channel that is the target of the judgment is the same as any of the specified minimum cost channels, the own node channel use examining unit A54 judges that the channel is included in the fifth channel group. The own node channel use examining unit A54 transmits the result of the judgment to the unused channel specifying unit A53.

The unused channel specifying unit A53 specifies an unused channel candidate based on the result of the judgment by the own node channel use examining unit A54. That is to say, the unused channel specifying unit A53 specifies a channel judged not to be included in the fifth channel group among the channels allocated to the radio interfaces A51, as an unused channel candidate.

For example, it is assumed that the channel 0 is allocated to a first radio interface A51, the channel 1 is allocated to a second radio interface A51 and a channel 2 is allocated to a third radio interface A51 in the node A5. Moreover, it is assumed that the link table storing unit A48 stores the link table shown in FIG. 4.

In this case, entry information including the channel 2 is not included in the link table. Therefore, the own node channel use examining unit A54 judges that the channel 2 allocated to the radio interface A51 is not included in the fifth channel group (i.e., specifies as an unused channel candidate).

The link table includes two entry information including 10.1.1.1 as an adjacent node address. A minimum cost channel in communication links corresponding to these two entry information is the channel 1. On the other hand, the channel 0 is a minimum cost channel in a communication link corresponding to entry information including 10.4.4.4 as an adjacent node address. Therefore according to the above assumptions, the own node channel use examining unit A54 judges that the channel 0 is included in the fifth channel group (i.e., does not specify as an unused channel candidate).

The adjacent node channel use examining unit A55 has a function of judging with respect to each of the unused channel candidates whether the unused channel candidate is included in the sixth channel group.

With respect to each of the unused channel candidates, in a case that a communication link using the unused channel candidate is established, the adjacent node channel use examining unit A55 transmits a channel use examination request message including (information for specifying) the unused channel candidate to a node (an adjacent node, e.g., the node A6) which is the other side of the communication link.

The adjacent node channel use examining unit A55 receives a channel use examination response message that is a response to the channel use examination request message, from each of the adjacent nodes. The adjacent node channel use examining unit A55 judges whether the unused channel candidate is included in the sixth channel group, based on the received channel use examination response message. The adjacent node channel use examining unit A55 transmits the result of the judgment to the unused channel specifying unit A53.

Further, when receiving a channel use examination request message from an adjacent node (e.g., the node A5), the adjacent node channel use examining unit A65 of the node A6 judges whether an unused channel candidate included in the channel use examination request message is a minimum cost channel. This minimum cost channel is a channel used by a communication link whose link cost representing the cost of transferring data from the node A6 to the adjacent node is the minimum among communication links established with the adjacent node.

To be specific, the adjacent node channel use examining unit A65 performs the judgment based on the link table stored by the link table storing unit A68.

That is to say, in a case that entry information including the same channel as the unused channel candidate and including the address of the adjacent node as a next hop address is not included in the link table, the adjacent node channel use examining unit A65 judges that the unused channel candidate is not the minimum cost channel.

On the other hand, in a case that entry information including the same channel as the unused channel candidate and including the address of the adjacent node as a next hop address is included in the link table, the adjacent node channel use examining unit A65 extracts the entry information including the address of the adjacent node as a next hop address from the link table.

In a case that a channel included in entry information in which the link cost is the minimum among the extracted entry information is the same as the unused channel candidate, the adjacent node channel use examining unit A65 judges that the unused channel candidate is the minimum cost channel. On the other hand, in a case that a channel included in the entry information that the link cost is the minimum among the extracted entry information is not the same as the unused channel candidate, the adjacent node channel use examining unit A65 judges that the unused channel candidate is not the minimum cost channel.

The adjacent node channel use examining unit A65 transmits a channel use examination response message representing the result of the judgment to the adjacent node (e.g., the node A5) having transmitted the channel use examination request message.

In this exemplary embodiment, the adjacent node channel use examining unit A55 also has the function of the adjacent node channel use examining unit A65. The adjacent node channel use examining unit A65 also has the function of the adjacent node channel use examining unit A55.

(Operation)

Next, an operation of the communication system according to the third exemplary embodiment will be described.

An operation of the node A5 when the node A5 specifies an unused channel and releases the specified unused channel, and an operation of the node A6 when the node A6 receives a channel use examination request message will be described in detail, respectively.

In this exemplary embodiment, it is assumed that the node A5 is located in the same position as the node A in the same network topology as the network topology 101 shown in FIG. 1A. Moreover, it is assumed that the node A6 is located in the same position as the node B in the network topology.

Figures 15, 16:
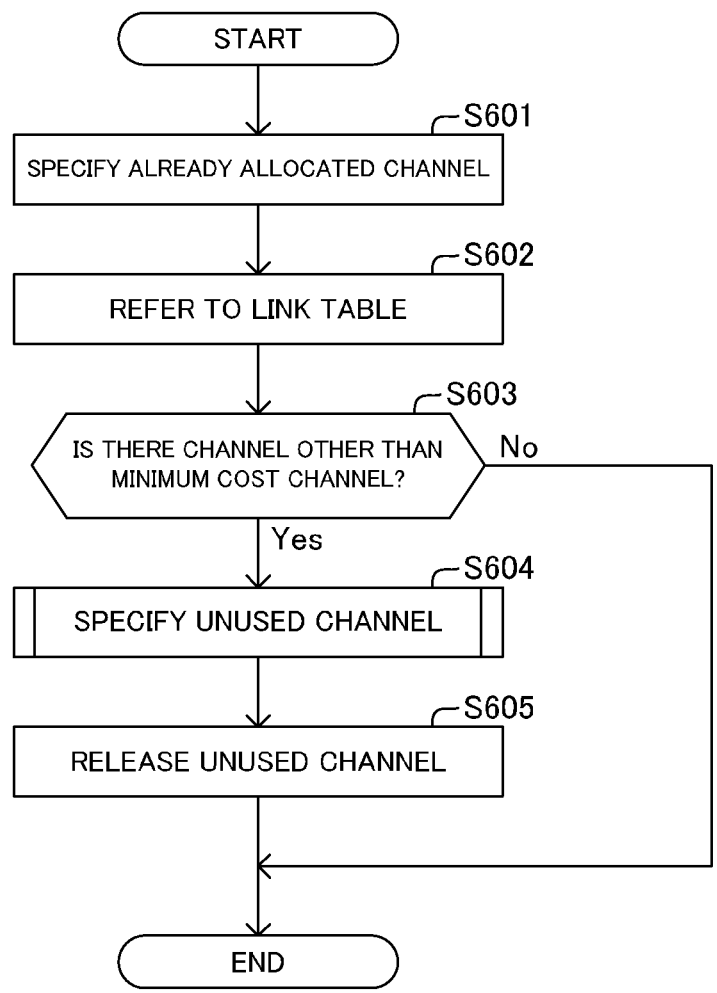
FIG. 15 is a diagram showing a link table stored by a node according to the third exemplary embodiment of the present invention.
FIG. 16 is a flowchart showing a program executed for releasing an unused channel by the node according to the third exemplary embodiment of the present invention.

In addition, it is assumed that the link table stored by the link table storing unit A58 of the node A5 is a link table shown in FIG. 15 and the link table stored by the link table storing unit A68 of the node A6 is the link table shown in FIG. 4.

Besides, it is assumed that the channel 0 is allocated to the first radio interface A51 of the node A5 and the channel 1 is allocated to the second radio interface A51 of the node A5.

At first, with reference to FIG. 16, an operation of the node A5 when the node A5 specifies an unused channel and releases the specified unused channel will be described.

Processes at steps S601, S604 and S605 in FIG. 16 are the same as the processes at steps S101, S102, S104 and S105 in FIG. 6, respectively. Therefore, a description thereof will be omitted.

That is to say, after specifying the already-allocated channels (step S601 of FIG. 16), the unused channel specifying unit A33 refers to the link table (step S602 of FIG. 16), and judges whether a channel other than a minimum cost channel exists among the already-allocated channels (step S603 of FIG. 16).

According to the above assumptions, the link table is composed of two entry information each including an adjacent node address 10.2.2.2 as shown in FIG. 15. In this exemplary embodiment, a minimum cost channel with respect to an adjacent node having the address 10.2.2.2 is the channel 1. That is to say, as a channel other than the minimum cost channel among the already-allocated channels, the channel 0 exists.

Therefore, the unused channel specifying unit A33 judges "Yes" at step S603 of FIG. 16 and proceeds to step S604 and, in the same manner as the node A1 in the first exemplary embodiment, executes the process shown in FIG. 7 and a process at step S605.

In a case that a channel other than the minimum cost channel among the already-allocated channels does not exist, the unused channel specifying unit A33 judges "No" at step S603 of FIG. 16 and ends the process.

Next, with reference to FIG. 17, an operation of the node A6 when the node A6 receives a channel use examination request message will be described.

Figure 17:
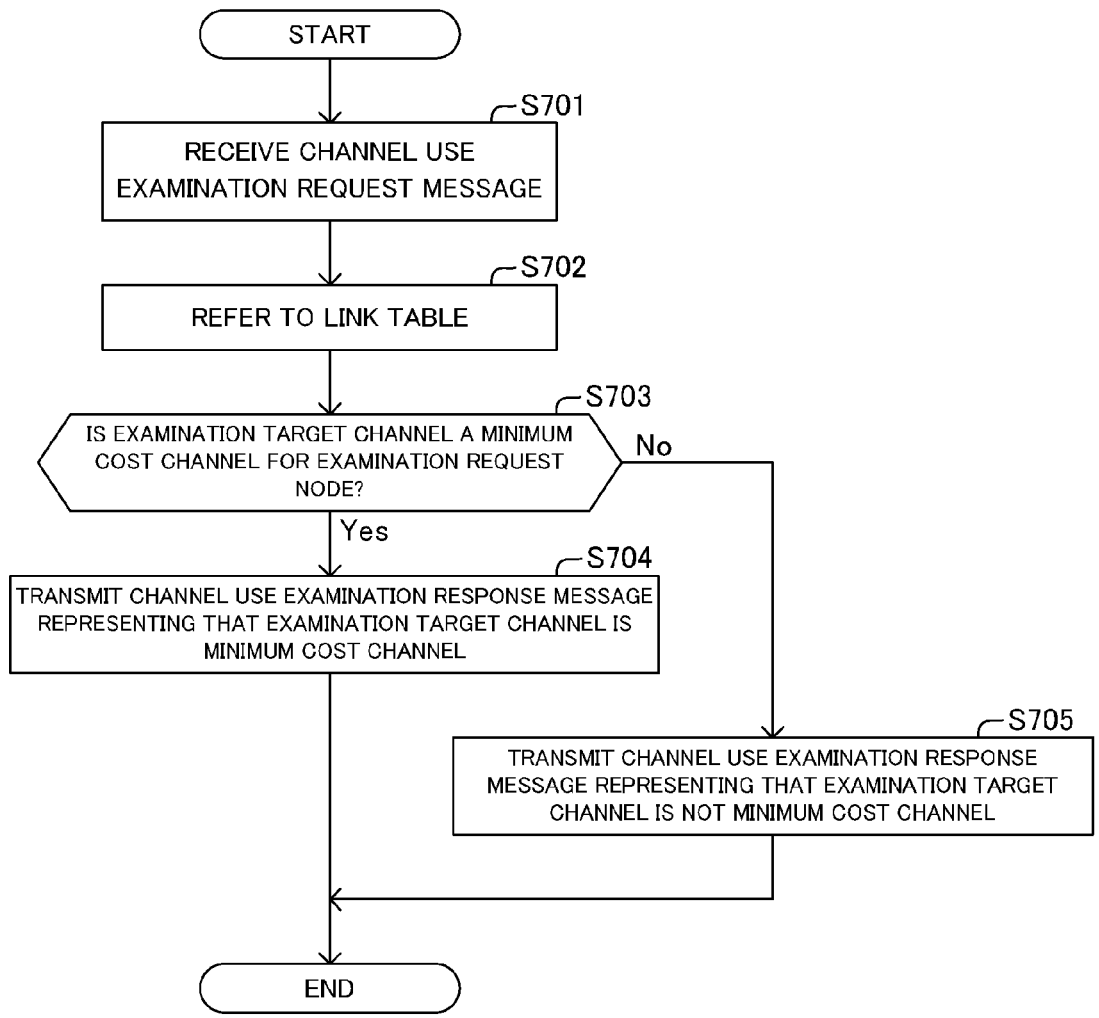
FIG. 17 is a flowchart showing a program executed for transmitting a channel use examination response message by the node according to the third exemplary embodiment of the present invention.

A process at step S701 in FIG. 17 is the same as the process at step S301 in FIG. 8. Therefore, a description thereof will be omitted.

After receiving a channel use examination request message from an adjacent node (e.g., the node A5) (step S701 in FIG. 17), the adjacent node channel use examining unit A65 of the node A6 refers to the link table (step S702 in FIG. 17), and judges whether an examination target channel is a minimum cost channel for the examination requesting node (step S703 in FIG. 17). This channel use examination request message includes information for specifying an unused channel candidate (the examination target channel) and information representing the address of the node A5 (the examination requesting node) as described above.

That is to say, the adjacent node channel use examining unit A65 extracts entry information including the address of the examination requesting node as an adjacent node address from the link table and, in a case that a channel included in entry information in which a link cost is the minimum among the extracted entry information matches the examination target channel, judges that the examination target channel is a minimum cost channel for the examination requesting node.

According to the above assumptions, the link table includes two entry information which include an adjacent address 10.1.1.1, respectively, as shown in FIG. 4. In this exemplary embodiment, a minimum cost channel for an adjacent node having the address 10.1.1.1 is the channel 1.

Therefore, in a case that the examination target channel is the channel 0 and the address of the examination requesting node (herein, the node A5) is 10.1.1.1, the adjacent node channel use examining unit A65 judges "No" at step S703 of FIG. 17, and proceeds to step S705.

Then, the adjacent node channel use examining unit A65 transmits a channel use examination response message representing that the examination target channel is not the minimum cost channel to the adjacent node (the examination requesting node, i.e., the node A5) having transmitted the channel use examination request message.

In a case that the examination target channel is judged to be the minimum cost channel for the examination requesting node, the adjacent node channel use examining unit A65 judges "Yes" at step S703 in FIG. 17 and proceeds to step S704.

Then, the adjacent node channel use examining unit A65 transmits a channel use examination response message representing that the examination target channel is the minimum cost channel to the adjacent node (the examination requesting node, i.e., the node A5) having transmitted the channel use examination request message.

As described above, according to the node A5 in the third exemplary embodiment of the present invention, it is possible to produce the same actions and effects as the node A1 in the first exemplary embodiment.

Among communication links established between an own node and a certain adjacent node, a communication link (a minimum cost link) in which the cost (a link cost) required for transferring data from the own node to the adjacent node or from the adjacent node to the own node is the minimum is set as a new use communication link with relatively high possibility, for example, when a failure occurs, even if the minimum cost link has not been set as a use communication link.

Thus, according to the node A5 in the third exemplary embodiment of the present invention, the node A5 specifies a channel other than a channel used for a communication link set as a use communication link and other than a channel used for the minimum cost link, as an unused channel. Therefore, it is possible to prevent that allocation of the channel used for the minimum cost link to the radio interface A51 is released. As a result, for example, when a failure occurs, it is possible to rapidly use the minimum cost link as a use communication channel.

<Fourth Exemplary Embodiment>

Figure 18:
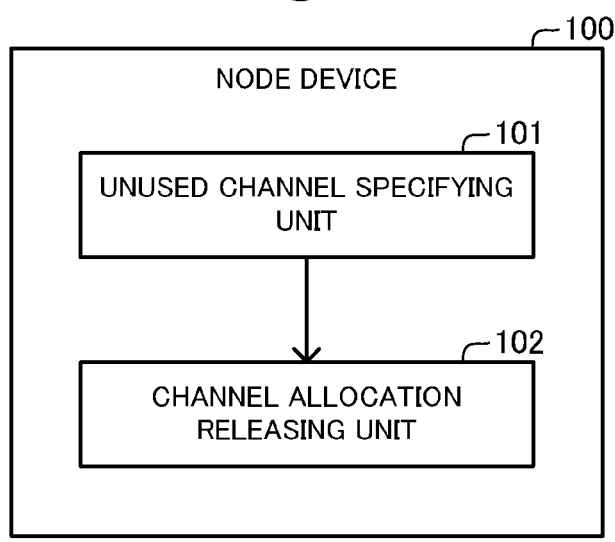
FIG. 18 is a block diagram showing the overview of a function of a node device according to a fourth exemplary embodiment of the present invention.

Next, a node device according to a fourth exemplary embodiment of the present invention will be described with reference to FIG. 18.

A node device 100 according to the fourth exemplary embodiment is a device having one or more radio interfaces and configuring a multi-hop communication network.

Moreover, this node device 100 is configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device.

In addition, the node device 100 includes:

an unused channel specifying unit (an unused channel specifying means) 101 for specifying an unused channel that is a channel other than a channel used by a communication link set as the use communication link among channels allocated to the radio interfaces; and a channel allocation releasing unit (a channel allocation releasing means) 102 for releasing allocation of the unused channel to the radio interfaces with the specified unused channel allocated.

According to this, the node device 100 specifies a channel that is not used when the node device 100 transfers data to an adjacent node device (i.e., a channel other than a channel used by a communication link set as a use communication link), as an unused channel. Then, the node device 100 releases allocation of the specified unused channel to the radio interfaces. As a result, it is possible to prevent a state in which a channel is wastefully allocated to the radio interfaces from being kept.

Although the present invention has been described above with reference to the exemplary embodiments, the present invention is not limited to the exemplary embodiments. The configurations and details of the present invention can be altered in various manners that can be understood by those skilled in the art within the scope of the present invention.

The respective functions of the node devices (the nodes) in the exemplary embodiments are realized by the CPU's execution of the programs (software), but may be realized by hardware such as a circuit.

Further, the programs in the above exemplary embodiments are stored in the storage device, but may be stored in a computer-readable recording medium. For example, the recording medium is a portable medium such as a flexible disk, an optical disk, a magneto-optical disk, and a semiconductor memory.

Further, as another modified example of the exemplary embodiments, any combinations of the exemplary embodiments and the modified examples may be employed.

<Supplementary Notes>

The whole or part of the exemplary embodiments disclosed above can be described as, but not limited to, the following supplementary notes.

(Supplementary Note 1)

A node device having one or more radio interfaces and configuring a multi-hop communication network, the node device being configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device, the node device including:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

According to this, the node device specifies a channel which the node device does not use when transferring data to an adjacent node device (i.e., a channel other than a channel used by a communication link set as a use communication link), as an unused channel. Then, the node device releases allocation of the specified unused channel to the radio interface. As a result, it is possible to prevent that a state in which the channel is wastefully allocated to the radio interface is kept.

(Supplementary Note 2)

The node device according to Supplementary Note 1, including a routing table storing means for storing a routing table including entry information in which a destination address of the destination of the received data and use communication link specification information for specifying the use communication link set for the destination of the data are associated with each other, wherein the unused channel specifying means is configured to specify the unused channel based on the stored routing table.

For example, use communication link specification information includes the address of a data transfer destination (i.e., a next hop address) and a channel.

(Supplementary Note 3)

The node device according to Supplementary Note 1 or 2, wherein the unused channel specifying means is configured to specify, as the unused channel, a channel other than a use channel that is a channel used by a communication link set as a use communication link used for transferring received data to the node device by each of adjacent node devices.

According to this, the node device specifies a channel which an adjacent node device does not use when transferring data to the node device among channels which the node device does not use when transferring data to the adjacent node device, as an unused channel. Therefore, it is possible to prevent that allocation of a channel which the adjacent node device uses when transferring the data to the node device to the radio interface is released.

(Supplementary Note 4)

The node device according to Supplementary Note 3, wherein the unused channel specifying means is configured to: specify a channel other than a channel used by a communication link set as the use communication link among the channels allocated to the radio interface, as an unused channel candidate; query each of the adjacent node devices whether to use the unused channel candidate as the use channel; and, when accepting a response representing not to use the unused channel candidate as the use channel from each of the adjacent node devices, specify the unused channel candidate as the unused channel.

(Supplementary Note 5)

The node device according to any of Supplementary Notes 1 to 4, wherein the unused channel specifying means is configured to specify, as the unused channel, a channel other than a channel used by each of auxiliary communication links that are auxiliary communication links set for destinations of received data among the established communication links.

According to this, the node device specifies a channel other than a channel used by a communication link set as a use communication link and other than a channel used by a communication link set as an auxiliary communication link, as an unused channel. Therefore, it is possible to prevent that allocation of the channel used by the communication link set as the auxiliary communication link to the radio interface is released.

(Supplementary Note 6)

The node device according to Supplementary Note 5, including an auxiliary routing table storing means for storing an auxiliary routing table including entry information in which a destination address of the destination of the received data and auxiliary communication link specification information for specifying the auxiliary communication link set for the destination of the data are associated with each other, wherein the unused channel specifying means is configured to specify the unused channel based on the stored auxiliary routing table.

(Supplementary Note 7)

The node device according to Supplementary Note 5 or 6, wherein the unused channel specifying means is configured to specify, as the unused channel, a channel other than an auxiliary channel that is a channel used by a communication link set as an auxiliary communication link that is an auxiliary communication link of a use communication link used for transferring received data to the node device by each of adjacent node devices.

According to this, it is possible to prevent that allocation of a channel used by an auxiliary communication link of a use communication link used when an adjacent node device transfers data to the node device to the radio interface is released.

(Supplementary Note 8)

The node device according to Supplementary Note 7, wherein the unused channel specifying means is configured to: specify a channel other than a channel used by a communication link set as the use communication link among the channels allocated to the radio interface, as an unused channel candidate; query each of the adjacent node devices whether to use the unused channel candidate as the auxiliary channel; and, when accepting a response representing not to use the unused channel candidate as the auxiliary channel from each of the adjacent node devices, specify the unused channel candidate as the unused channel.

(Supplementary Note 9)

The node device according to any of Supplementary Notes 1 to 8, wherein the unused channel specifying means is configured to:

for each of adjacent node devices, specify a minimum cost channel that is a channel used by a communication link in which a link cost is minimum, the link cost representing a cost required for transferring data from the node device to the adjacent node device, among communication links established with the adjacent node device; and specify, as the unused channel, a channel other than the specified minimum cost channel among the channels allocated to the radio interface.

Among communication links established with a certain adjacent node device, a communication link (a minimum communication link) in which the cost (a link cost) required for transferring data from the node device to the adjacent node device is the minimum is set as a new use communication link with relatively high possibility, for example, when a failure occurs, even when it is not set as a use communication link.

According to the above configuration, the node device specifies a channel other than a channel used by a communication link set as a use communication link and other than a channel used by the minimum cost link, as an unused channel. Therefore, it is possible to prevent that allocation of the channel used by the minimum cost link to the radio interface is released. As a result, for example, when a failure occurs, it is possible to quickly use the minimum cost link as the use communication link.

(Supplementary Note 10)

The node device according to Supplementary Note 9, wherein the unused channel specifying means is configured to:

for each of the adjacent node devices, specify a minimum cost channel that is a channel used by a communication link in which a link cost is minimum, the link cost representing a cost required for transferring data from the adjacent node device to the node device, among communication links established with the adjacent node device; and specify, as the unused channel, a channel other than the specified minimum cost channel among the channels allocated to the radio interface.

Among communication links established with a certain adjacent node device, a communication link (a minimum communication link) in which the cost (a link cost) required for transferring data from the adjacent node device to the node device (the own device) is the minimum is set as a new use communication link with relatively high possibility, for example, when a failure occurs, even when it is not set as a use communication link.

According to the above configuration, the node device specifies a channel other than a channel used by a communication link set as a use communication link and other than a channel used by the minimum cost link, as an unused channel. Therefore, it is possible to prevent that allocation of the channel used by the minimum cost link to the radio interface is released. As a result, for example, when a failure occurs, it is possible to quickly use the minimum cost link as the use communication link.

(Supplementary Note 11)

The node device according to Supplementary Note 10, wherein the unused channel specifying means is configured to: specify a channel other than a channel used by a communication link set as the use communication link among the channels allocated to the radio interface, as an unused channel candidate; query each of the adjacent node devices whether the unused channel candidate is the minimum cost channel; and, when accepting a response representing that the unused channel candidate is not the minimum cost channel from each of the adjacent node devices, specify the unused channel candidate as the unused channel.

(Supplementary Note 12)

A node device having one or more radio interfaces and configuring a multi-hop communication network, the node device being configured to:

allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device; and when queried by the adjacent node device whether to use an unused channel candidate specified by the adjacent node device as a use channel that is a channel used by a communication link set as the use communication link, judge whether a communication link established with the adjacent node device and using the unused channel candidate is set as the use communication link; and in a case that the communication link is not set as the use communication link, transmit a response representing not to use the unused channel candidate as the use channel to the adjacent node device.

(Supplementary Note 13)

The node device according to Supplementary Note 12, configured to: when queried by the adjacent node device whether to use an unused channel candidate specified by the adjacent node device as an auxiliary channel that is a channel used by a communication link set as an auxiliary communication link that is an auxiliary communication link of the use communication link, judge whether a communication link established with the adjacent node device and using the unused channel candidate is set as the auxiliary communication link; and in a case that the communication link is not set as the auxiliary communication link, transmit a response representing not to use the unused channel candidate as the auxiliary channel to the adjacent node device.

(Supplementary Note 14)

The node device according to Supplementary Note 12 or 13, configured to: when queried by the adjacent node device whether an unused channel candidate specified by the adjacent node device is a minimum cost channel used by a communication link in which a link cost is minimum, the link cost representing a cost required for transferring data from the node device to the adjacent node device, among communication links established with the adjacent node device is a minimum cost channel, transmit a response representing whether a communication link established with the adjacent node device and using the unused channel candidate is the minimum cost channel, to the adjacent node device.

(Supplementary Note 15)

A node device controlling method applied to a node device having one or more radio interfaces and configuring a multi-hop communication network, the node device controlling method including:

allocating a channel for communication to each of the radio interfaces;

between the radio interface and a radio interface which is included by an adjacent node device and to which a same channel as the channel allocated to the radio interface is allocated, establishing a communication link using the channels;

by using a use communication link that is a communication link set for a destination of received data among established communication links, transferring the data to the adjacent node device;

specifying an unused channel that is a channel other than a channel used by a communication link set as the use communication link among channels allocated to the radio interface; and releasing allocation of the unused channel to the radio interface with the specified unused channel allocated.

(Supplementary Note 16)

The node device controlling method according to Supplementary Note 15, including specifying the unused channel based on a routing table including entry information in which a destination address of the destination of the received data and use communication link specification information for specifying the use communication link set for the destination of the data are associated with each other.

(Supplementary Note 17)

A multi-hop communication system including a plurality of node devices each having one or more radio interfaces, wherein each of the node devices is configured to: allocate a channel for communication to each of the radio interfaces included by the node device; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device, the multi-hop communication system including:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

(Supplementary Note 18)

The multi-hop communication system according to Supplementary Note 17, wherein:

each of the node devices including a routing table storing means for storing a routing table including entry information in which a destination address of the destination of the received data and use communication link specification information for specifying the use communication link set for the destination of the data are associated with each other; and the unused channel specifying means is configured to specify the unused channel based on the stored routing table.

(Supplementary Note 19)

A node device controlling program executed by a node device having one or more radio interfaces and configuring a multi-hop communication network, wherein the node device is configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device, the node device controlling program including instructions for causing the node device to realize:

an unused channel specifying means for specifying an unused channel that is a channel other than a channel used by a communication link set as the use communication link among channels allocated to the radio interface; and a channel allocation releasing means for releasing allocation of the unused channel to the radio interface with the specified unused channel allocated.

(Supplementary Note 20)

The node device control program according to Supplementary Note 19, wherein the unused channel specifying means is configured to specify the unused channel based on a routing table including entry information in which a destination address of the destination of the received data and use communication link specification information for specifying the use communication link set for the destination of the data are associated with each other.

(Supplementary Note 21)

A node device controlling program executed by a node device having one or more radio interfaces and configuring a multi-hop communication network, wherein the node device is configured to allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device, the node device controlling program including instructions for causing the node device to, when queried by the adjacent node device whether to use an unused channel candidate specified by the adjacent node device as a use channel that is a channel used by a communication link set as the use communication link, judge whether a communication link established with the adjacent node device and using the unused channel candidate is set as the use communication link; and in a case that the communication link is not set as the use communication link, transmit a response representing not to use the unused channel candidate as the use channel to the adjacent node device.

The present invention is based upon and claims the benefit of priority from Japanese patent application No. 2010-234131, filed on Oct. 19, 2010, the disclosure of which is incorporated herein in its entirety by reference.

INDUSTRIAL APPLICABILITY

The present invention can be applied to a node device having a radio interface and configuring a multi-hop communication network, and so on.

DESCRIPTION OF REFERENCE NUMERALS

A1 to A6 node device (node)
A11 radio interface
A12 channel allocating unit
A13 unused channel specifying unit
A14 own node channel use examining unit
A15 adjacent node channel use examining unit
A16 routing protocol unit
A17 routing table storing unit
A1*b* link table storing unit
A25 adjacent node channel use examining unit
A26 routing protocol unit
A27 routing table storing unit
A31 radio interface
A32 channel allocating unit
A33 unused channel specifying unit
A34 own node channel use examining unit
A35 adjacent node channel use examining unit
A36 routing protocol unit
A37 routing table storing unit
A38 link table storing unit
A39 auxiliary routing table storing unit
A45 adjacent node channel use examining unit
A46 routing protocol unit
A47 routing table storing unit
A49 auxiliary routing table storing unit
A51 radio interface
A52 channel allocating unit
A53 unused channel specifying unit
A54 own node channel use examining unit
A55 adjacent node channel use examining unit
A56 routing protocol unit
A57 routing table storing unit
A58 link table storing unit
A65 adjacent node channel use examining unit
A66 routing protocol unit
A68 link table storing unit
100 node device
101 unused channel specifying unit
102 channel allocation releasing unit

What is claimed is:

1. A node device having one or more radio interfaces and configuring a multi-hop communication network, the node device being configured to: allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device, the node device comprising:

an unused channel specifying unit for specifying an unused channel among channels allocated to the radio interface, the unused channel being a channel other than a channel used by a communication link set as the use communication link and being a channel other than a use channel, the use channel being a channel used by a communication link set as a use communication link used for transferring received data to the node device by each of adjacent node devices;

a channel allocation releasing unit for releasing allocation of the specified unused channel to the radio interface with the unused channel allocated, wherein the unused channel specifying unit is configured to: specify a channel other than a channel used by a communication link set as the use communication link among the channels allocated to the radio interface, as an unused channel candidate; query each of the adjacent node devices whether to use the unused channel candidate as the use channel; and, when accepting a response representing not to use the unused channel candidate as the use channel from each of the adjacent node devices, specify the unused channel candidate as the unused channel.

2. The node device according to claim 1, comprising a routing table storing unit for storing a routing table including entry information in which a destination address of the destination of the received data and use communication link specification information for specifying the use communication link set for the destination of the data are associated with each other, wherein the unused channel specifying unit is configured to specify the unused channel based on the stored routing table.

3. The node device according to claim 1, wherein the unused channel specifying unit is configured to specify, as the unused channel, a channel other than a channel used by each of auxiliary communication links that are auxiliary communication links set for destinations of received data among the established communication links.

4. The node device according to claim 3, wherein the unused channel specifying unit is configured to specify, as the unused channel, a channel other than an auxiliary channel that is a channel used by a communication link set as an auxiliary communication link the auxiliary communication link an auxiliary communication link of a use communication link used for transferring received data to the node device by each of adjacent node devices.

5. The node device according to claim 1, wherein the unused channel specifying unit is configured to:
for each of adjacent node devices, specify a minimum cost channel that is a channel used by a communication link in which a link cost is minimum, the link cost representing a cost required for transferring data from the node device to the adjacent node device, among communication links established with the adjacent node device; and
specify, as the unused channel, a channel other than the specified minimum cost channel among the channels allocated to the radio interface.

6. A node device having one or more radio interfaces and configuring a multi-hop communication network, the node device being configured to:
allocate a channel for communication to each of the radio interfaces; between the radio interface and a radio interface which is included by an adjacent node device and to which a same channel as the channel allocated to the radio interface is allocated, establish a communication link using the channels; and, by using a use communication link that is a communication link set for a destination of received data among established communication links, transfer the data to the adjacent node device;
specify an unused channel among channels allocated to the radio interface, the unused channel being channel other than a channel used by a communication link set as the use communication link and being a channel other than a use channel, the use channel being a channel used by a communication link set as a use communication link used for transferring received data to the node device by each of adjacent node devices;
release allocation of the specified unused channel to the radio interface with the unused channel allocated; and
specify a channel other than a channel used by a communication link set as the use communication link among the channels allocated to the radio interface, as an unused channel candidate; query each of the adjacent node devices whether to use the unused channel candidate as the use channel; and, when accepting a response representing not to use the unused channel candidate as the use channel from each of the adjacent node devices, specify the unused channel candidate as the unused channel.

7. A node device controlling method applied to a node device having one or more radio interfaces and configuring a multi-hop communication network, the node device controlling method comprising:

allocating a channel for communication to each of the radio interfaces;
between the radio interface and a radio interface which is included by an adjacent node device and to which a same channel as the channel allocated to the radio interface is allocated, establishing a communication link using the channels;
by using a use communication link that is a communication link set for a destination of received data among established communication links, transferring the data to the adjacent node device;
specifying an unused channel among channels allocated to the radio interface, the unused channel being channel other than a channel used by a communication link set as the use communication link and being a channel other than a use channel, the use channel being a channel used by a communication link set as a use communication link used for transferring received data to the node device by each of adjacent node devices;
releasing allocation of the specified unused channel to the radio interface with the unused channel allocated; and
specifying a channel other than a channel used by a communication link set as the use communication link among the channels allocated to the radio interface, as an unused channel candidate; query each of the adjacent node devices whether to use the unused channel candidate as the use channel; and, when accepting a response representing not to use the unused channel candidate as the use channel from each of the adjacent node devices, specify the unused channel candidate as the unused channel.

8. The node device according to claim 1, wherein the unused channel specifying unit is configured to: specify a channel other than a channel used by a communication link set as the use communication link among the channels allocated to the radio interface, as an unused channel candidate; query each of the adjacent node devices whether to use the unused channel candidate as the use channel; and, when accepting a response representing not to use the unused channel candidate as the use channel from each of the adjacent node devices, specify the unused channel candidate as the unused channel.

9. The node device according to claim 3, including an auxiliary routing table storing unit for storing an auxiliary routing table including entry information in which a destination address of the destination of the received data and auxiliary communication link specification information for specifying the auxiliary communication link set for the destination of the data are associated with each other,
wherein the unused channel specifying unit is configured to specify the unused channel based on the stored auxiliary routing table.

10. The node device according to claim 4, wherein the unused channel specifying unit is configured to: specify a channel other than a channel used by a communication link set as the use communication link among the channels allocated to the radio interface, as an unused channel candidate; query each of the adjacent node devices whether to use the unused channel candidate as the auxiliary channel; and, when accepting a response representing not to use the unused channel candidate as the auxiliary channel from each of the adjacent node devices, specify the unused channel candidate as the unused channel.

11. The node device according to claim 5, wherein the unused channel specifying unit is configured to: specify a channel other than a channel used by a communication link set as the use communication link among the channels allocated to the radio interface, as an unused channel candidate; query each of the adjacent node devices whether the unused channel candidate is the minimum cost channel; and, when accepting a response representing that the unused channel candidate is not the minimum cost channel from each of the adjacent node devices, specify the unused channel candidate as the unused channel.

* * * * *